(12) United States Patent
Wattwood

(10) Patent No.: US 11,076,303 B2
(45) Date of Patent: Jul. 27, 2021

(54) ANTENNA ALIGNMENT TOOL GENERATING EARTH BROWSER FILE AND RELATED METHODS

(71) Applicant: SUNSIGHT HOLDINGS, LLC, Maitland, FL (US)

(72) Inventor: James A. Wattwood, New Smyrna Beach, FL (US)

(73) Assignee: SUNSIGHT HOLDINGS, LLC, Sanford, FL (US)

( * ) Notice: Subject to any disclaimer, the term of this patent is extended or adjusted under 35 U.S.C. 154(b) by 0 days.

(21) Appl. No.: 16/717,005

(22) Filed: Dec. 17, 2019

(65) Prior Publication Data
US 2020/0196163 A1 Jun. 18, 2020

Related U.S. Application Data

(60) Provisional application No. 62/781,338, filed on Dec. 18, 2018, provisional application No. 62/824,936, filed on Mar. 27, 2019.

(51) Int. Cl.
*H04W 16/28* (2009.01)
*H04B 17/345* (2015.01)
(Continued)

(52) U.S. Cl.
CPC ............ *H04W 16/28* (2013.01); *H01Q 3/005* (2013.01); *H04B 17/345* (2015.01); *H04W 4/029* (2018.02); *H04W 4/20* (2013.01)

(58) Field of Classification Search
CPC ........... H04M 1/7253; H04M 2250/04; H04M 1/72519; H04M 2250/52; H04M 1/0249; H04W 4/029; H04W 4/20; H04W 56/00; H04W 72/046; H04W 16/26; H04W 40/22; H04W 52/0229; H04W 52/52; H04W 88/04; H04W 88/08; H04W 4/80; H04W 16/28; H04W 4/025; H04W 4/023; H04W 64/00; H04W 64/003; H04W 4/02; H04B 7/04; H04B 7/155; H04B 7/15557;
(Continued)

(56) References Cited

U.S. PATENT DOCUMENTS 5,313,213 A * 5/1994 Neumann ............... H01Q 1/125
342/165
6,542,117 B1 * 4/2003 Broughton ............... H01Q 1/24
342/359
(Continued)

FOREIGN PATENT DOCUMENTS

WO WO2018154514 12/2008
WO WO2016003864 1/2016

*Primary Examiner* — Lana N Le
(74) *Attorney, Agent, or Firm* — Allen, Dyer, Doppelt + Gilchrist, P.A.

(57) ABSTRACT

An antenna alignment tool may include a housing to be temporarily mounted to an antenna during alignment. The antenna alignment tool may also include a processor carried by the housing and configured to determine actual position data, actual azimuth data, and actual tilt data for the antenna. The processor may also be configured to generate an earth browser file for displaying on an earth browser a representative antenna pointing directional indicator based upon the actual position data, actual azimuth data, and actual tilt data for the antenna.

27 Claims, 26 Drawing Sheets

(51) Int. Cl.
  *H01Q 3/00* (2006.01)
  *H04W 4/029* (2018.01)
  *H04W 4/20* (2018.01)

(58) Field of Classification Search
  CPC ........ H04B 1/52; H04B 7/00; H04B 7/15528;
    H04B 7/15535; H04B 17/345; H04B
    7/0695; H04B 7/088; H04B 7/10; H04B
    1/401; H04B 7/0617; H04B 7/0639;
    H04B 7/0691; H04B 17/12; H04B
    7/0413; H04B 7/0608; H04B 7/0817;
    H04B 7/0874; H04B 17/21; H04B 17/23;
    H04B 17/27; H04B 7/043; H04B
    7/18517; H01Q 3/005; H01Q 1/125;
    H01Q 1/246; H01Q 25/005; H01Q 25/00;
    H01Q 3/24; H01Q 3/04; H01Q 19/062;
    H01Q 17/001; H01Q 1/241; H01Q
    21/293; H01Q 3/16; H01Q 3/34; H01Q
    9/0442; H01Q 1/1257; H01Q 3/08; H01Q
    21/08; H01Q 1/243; H01Q 13/0258;
    H01Q 15/08; H01Q 1/185; H01Q 3/06;
    H01Q 3/14; H01Q 3/26; H01Q 3/32;
    G01S 3/14; G01S 19/53; G01S 7/04;
    G01S 13/42; G01S 1/0423; G01S 3/18;
    G01S 3/28; G01S 3/74; G01S 5/04; G01S
    5/06; G01S 19/14; G01S 19/35; G01S
    19/51; H04L 67/42
  USPC ... 455/25, 63.4, 19, 13.3, 446, 562.1, 575.7,
    455/97, 121, 129, 193.1; 342/387, 462,
    342/353, 120, 142, 367, 357.36; 343/760,
    343/766, 757
  See application file for complete search history.

(56) References Cited

U.S. PATENT DOCUMENTS

| | | | |
|---|---|---|---|
| 7,501,993 B2 | 3/2009 | Boucher | |
| 7,718,941 B2 * | 5/2010 | Austin | G01S 3/785 |
| | | | 250/203.4 |
| 7,782,861 B2 | 8/2010 | Reda et al. | |
| 8,018,390 B2 * | 9/2011 | Davidson | H01Q 3/06 |
| | | | 343/754 |
| 8,183,983 B2 | 6/2012 | Farmer | |
| 8,193,983 B1 | 6/2012 | Farmer | |
| 8,451,171 B1 | 5/2013 | Santoru | |
| 8,849,288 B2 | 9/2014 | Vilhar | |
| 9,112,621 B1 * | 8/2015 | Mishra | H04H 20/74 |
| 9,316,486 B2 | 4/2016 | Neubauer | |
| 9,690,454 B2 | 6/2017 | Rezvan | |
| 9,781,233 B2 | 10/2017 | Wattwood et al. | |
| 10,096,886 B2 | 10/2018 | Xu et al. | |
| 10,116,893 B1 * | 10/2018 | Reis | H04N 5/232935 |
| 10,355,352 B2 * | 7/2019 | Wattwood | H01Q 3/08 |
| 10,419,948 B1 * | 9/2019 | Labadie | H01Q 3/005 |
| 10,499,362 B2 * | 12/2019 | Wattwood | H04W 64/006 |
| 10,896,327 B1 * | 1/2021 | Lablans | H04W 4/021 |
| 2003/0023412 A1 * | 1/2003 | Rappaport | H04W 16/20 |
| | | | 703/1 |
| 2003/0224801 A1 | 12/2003 | Lovberg et al. | |
| 2006/0178142 A1 | 8/2006 | Lovberg et al. | |
| 2008/0012750 A1 * | 1/2008 | Austin | H01Q 3/02 |
| | | | 342/52 |
| 2008/0088518 A1 | 4/2008 | Charash et al. | |
| 2009/0021447 A1 * | 1/2009 | Austin | H01Q 1/125 |
| | | | 343/880 |
| 2009/0243930 A1 | 10/2009 | Tien | |
| 2010/0188304 A1 * | 7/2010 | Clymer | H01Q 13/0258 |
| | | | 343/753 |
| 2011/0102234 A1 * | 5/2011 | Adams | G01S 13/888 |
| | | | 342/22 |
| 2011/0199274 A1 * | 8/2011 | Dalmazzo | G01B 21/22 |
| | | | 343/760 |
| 2012/0007982 A1 * | 1/2012 | Giuffrida | H04N 7/005 |
| | | | 348/144 |
| 2013/0135146 A1 | 5/2013 | Ransom et al. | |
| 2014/0205205 A1 * | 7/2014 | Neubauer | H01Q 1/125 |
| | | | 382/291 |
| 2014/0266907 A1 * | 9/2014 | Taylor, Jr. | G01S 5/10 |
| | | | 342/387 |
| 2015/0318904 A1 * | 11/2015 | Lee | H04B 7/0617 |
| | | | 455/63.4 |
| 2015/0357708 A1 * | 12/2015 | Au | H01Q 3/08 |
| | | | 343/760 |
| 2016/0056523 A1 | 2/2016 | Olsson et al. | |
| 2016/0056525 A1 * | 2/2016 | Hansryd | H01Q 15/08 |
| | | | 342/359 |
| 2016/0345286 A1 | 11/2016 | Jamieson | G01S 3/023 |
| 2017/0045623 A1 * | 2/2017 | Zlogar | G01S 3/14 |
| 2017/0069963 A1 * | 3/2017 | Wattwood | G01S 19/35 |
| 2017/0085314 A1 * | 3/2017 | Davis | H04B 7/18513 |
| 2018/0038937 A1 * | 2/2018 | Afzal | G01S 5/0226 |
| 2018/0062246 A1 | 3/2018 | Hershey et al. | |
| 2018/0213417 A1 * | 7/2018 | Lysejko | H04W 24/02 |
| 2018/0372881 A1 * | 12/2018 | Michaelis | G01S 5/02 |
| 2019/0052345 A1 * | 2/2019 | Yunoki | H04W 16/28 |
| 2019/0115957 A1 * | 4/2019 | Rydstrom | H01Q 1/125 |
| 2019/0131703 A1 * | 5/2019 | Meyer | H01Q 1/1228 |

* cited by examiner ial Appli-
ANTENNA ALIGNMENT TOOL GENERATING EARTH BROWSER FILE AND RELATED METHODS

CROSS-REFERENCE TO RELATED APPLICATIONS

This application claims priority to U.S. Provisional Application Ser. No. 62/781,338 filed on Dec. 18, 2018 and U.S. Provisional Application Ser. No. 62/824,936 filed on Mar. 27, 2019, the contents of which are herein incorporated by reference in their entirety.

TECHNICAL FIELD

The present embodiments are directed to the field of antennas, and more particularly, to antenna alignment systems and related methods.

BACKGROUND

It may be desirable to have antennas aligned, not only for operation, but for increased communication efficiency. Present day alignment techniques may be relatively time consuming and involve picking visible landmarks somewhere between two end points or antennas. An educated guess or estimate is made on where the other end point would likely be relative to a given end point. Either or both antennas may be physically adjusted, for example, in azimuth and tilt, in an attempt to align the antennas. This may be particularly difficult as microwave links, for example, can have a length in the 40 mile range, which is beyond a human's visible sight range.

This present day guess and check method involves an increased amount of time for a technician to be on top of a tower moving the antenna back and forth in an attempt to find the other end point.

U.S. Patent Application Publication No. 2016/0056525 to Hansryd et al. is directed to a radio antenna alignment tool. More particularly, Hansryd et al. discloses a sensor unit connected to a first directive antenna. The sensor unit determines a present direction of the first directive antenna. An interface on which sensor information that includes the present direction can be accessed. A guide device receives, on a first input port, the present direction of the first directive antenna from the interface of the sensor unit and indicates to a user at least one of the present direction of the first directive antenna, the location of the second antenna, and a preferred direction of the first directive antenna. The preferred direction of the first directive antenna is determined to maximize a signal quality metric for communication between the first directive antenna and at least one second antenna.

A sector antenna is a type of directional microwave antenna having a sector-shaped radiation pattern. A sector antenna may be particularly useful at cell phone base-station sites. A particular antenna site may include several sector antennas, for example, to increase antenna coverage. However, multiple sectors on a given antenna site may increase the likelihood of antenna interference. To address potential interference among sector antennas on a given antenna site, it may be desirable to align or position each sector antenna. It might also be desired to keep accurate records of antenna alignment.

SUMMARY

An antenna alignment tool may include a housing to be temporarily mounted to an antenna during alignment. The antenna alignment tool may also include a processor carried by the housing and configured to determine actual position data, actual azimuth data, and actual tilt data for the antenna. The processor may also be configured to generate an earth browser file for displaying on an earth browser a representative antenna pointing directional indicator based upon the actual position data, actual azimuth data, and actual tilt data for the antenna.

The antenna may have an antenna boresight, and the representative antenna pointing directional indicator may be representative of a pointing direction of the antenna boresight, for example. The representative antenna pointing directional indicator may include an arrow.

The antenna may have an antenna gain pattern, and the representative antenna pointing directional indicator may be representative of the antenna gain pattern. The antenna may have an antenna sector direction, and the representative antenna pointing directional indicator may be representative of the antenna sector direction, for example.

The representative antenna pointing directional indicator may stop at earth browser obstructions, for example. The antenna alignment tool may also include wireless communications circuitry carried by the housing and cooperating with the processor to wirelessly communicate the earth browser file to a remote device.

The processor may be configured to obtain actual position data, actual azimuth data, and actual tilt data for at least one additional antenna. The processor may also be configured to generate the earth browser file for displaying on the earth browser a further representative antenna pointing directional indicator based upon the actual position data, actual azimuth data, and actual tilt data for the at least one additional antenna. The representative and further representative antenna pointing directional indicators may each have a different associated visual characteristic, for example.

The earth browser may include Google Earth. The earth browser file may include a keyhole markup language (KML) file, for example. The earth browser may include an input for displaying geographical scenery at a corresponding geographic location of the antenna at a selected historical time period.

A method aspect is directed to a method of aligning an antenna using an antenna alignment tool to be temporarily mounted to an antenna during alignment. The method may include using the antenna alignment tool to determine actual position data, actual azimuth data, and actual tilt data for the antenna. The antenna alignment tool may also be used to generate an earth browser file for displaying on an earth browser a representative antenna pointing directional indicator based upon the actual position data, actual azimuth data, and actual tilt data for the antenna.

DETAILED DESCRIPTION

Figure 1:
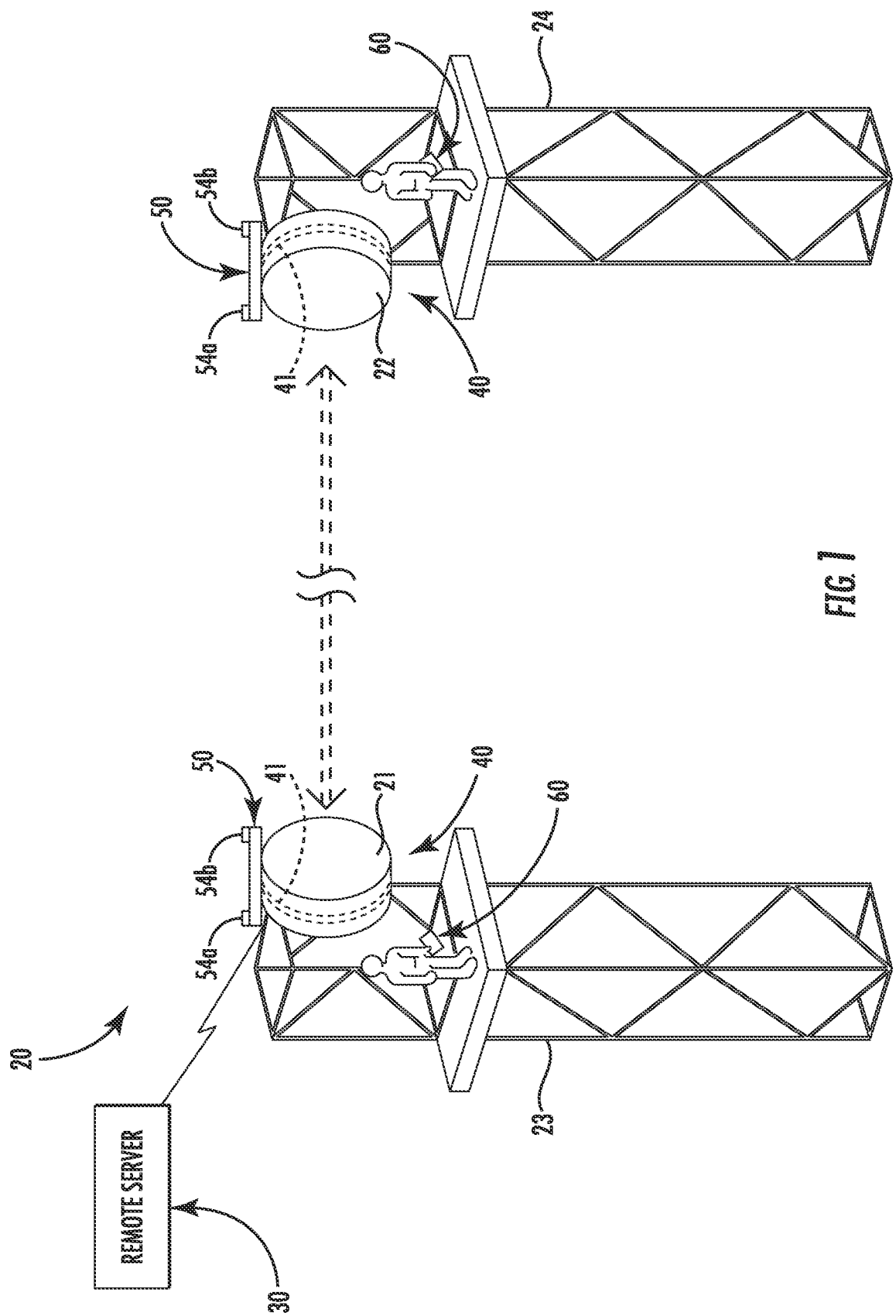
FIG. 1 is a schematic diagram of an alignment system in accordance with an embodiment.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime notation is used to indicate like elements in different embodiments.

Referring initially to FIGS. 1-4, an alignment system 20 for point-to-point alignment of spaced apart first and second antennas 21, 22 is illustrated. The first and second antennas 21, 22 are geographically spaced apart and carried by respective towers 23, 24, for example, and may be microwave antennas. The first and second antennas 21, 22 may define, for example, point microwave antenna links (e.g., backhaul data from one cellular tower to another). Of course, the first and second antennas 21, 22 may be other and/or different types of antennas and may define other and/or additional types of communication links (e.g. powered, unpowered, etc.).

The alignment system 20 includes a remote server 30 that includes a remote server processor 31 and a remote server memory 32 coupled thereto. The remote server memory 32 stores the actual position data of the given antenna for the given antenna 21, 22. The remote sever 30, and more particularly, the processor 31 determines respective target azimuth and tilt (i.e., elevation angle) data for each of the first and second spaced apart antennas 21, 22 based upon actual position data of the first and second spaced apart antennas.

The alignment system 20 also includes an end-point alignment kit 40. Each end-point alignment kit 40 includes a technician tool 60, and an antenna alignment device 50 to be temporarily mounted to a given antenna 21, 22 during alignment, for example. More particularly, each antenna alignment device 50 may be removably coupled to a respective antenna 21, 22 by way of a mount 41. The mount 41 may include an adjustable band or strap, for example, to secure the antenna alignment device 50 to the given antenna 21, 22. The mount 41 may also permit adjustment of the antenna alignment device 50 relative to the given antenna 21, 22, for example, in tilt, azimuth, orientation, etc. Of course the mount 41 may include other securing mechanisms, for example, elastic or rubber bands, ratcheting mechanisms, or clamping device, and may permit other and/or additional adjustments relative to the given antenna 21, 22. The antenna alignment system 20 may include more than one end-point alignment kit 40, as will be described in further detail below.

Figure 2:
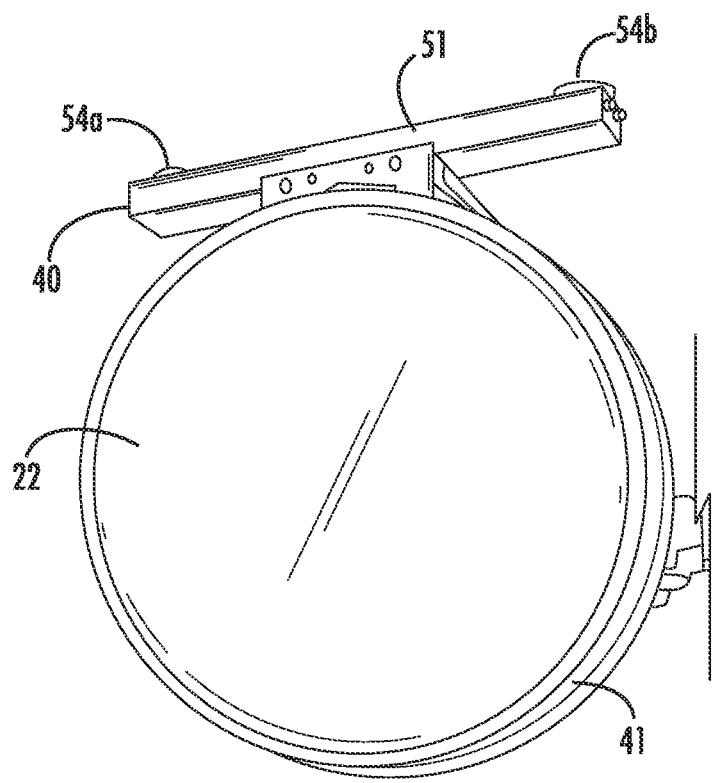
FIG. 2 is a diagram of an antenna alignment device of FIG. 1 mounted to an antenna.
Figure 3:
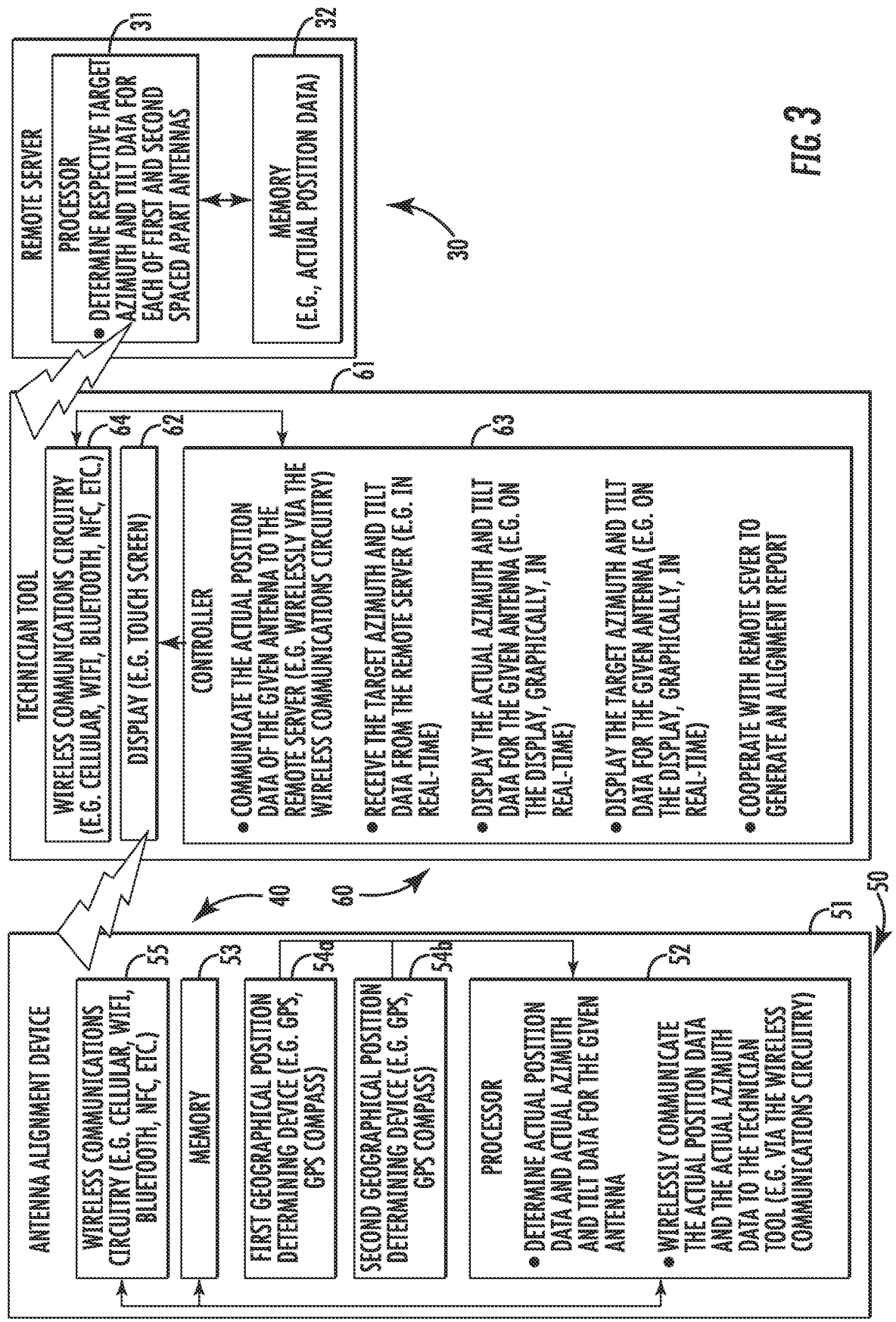
FIG. 3 is a schematic block diagram of the alignment system of FIG. 1.
Figure 4:
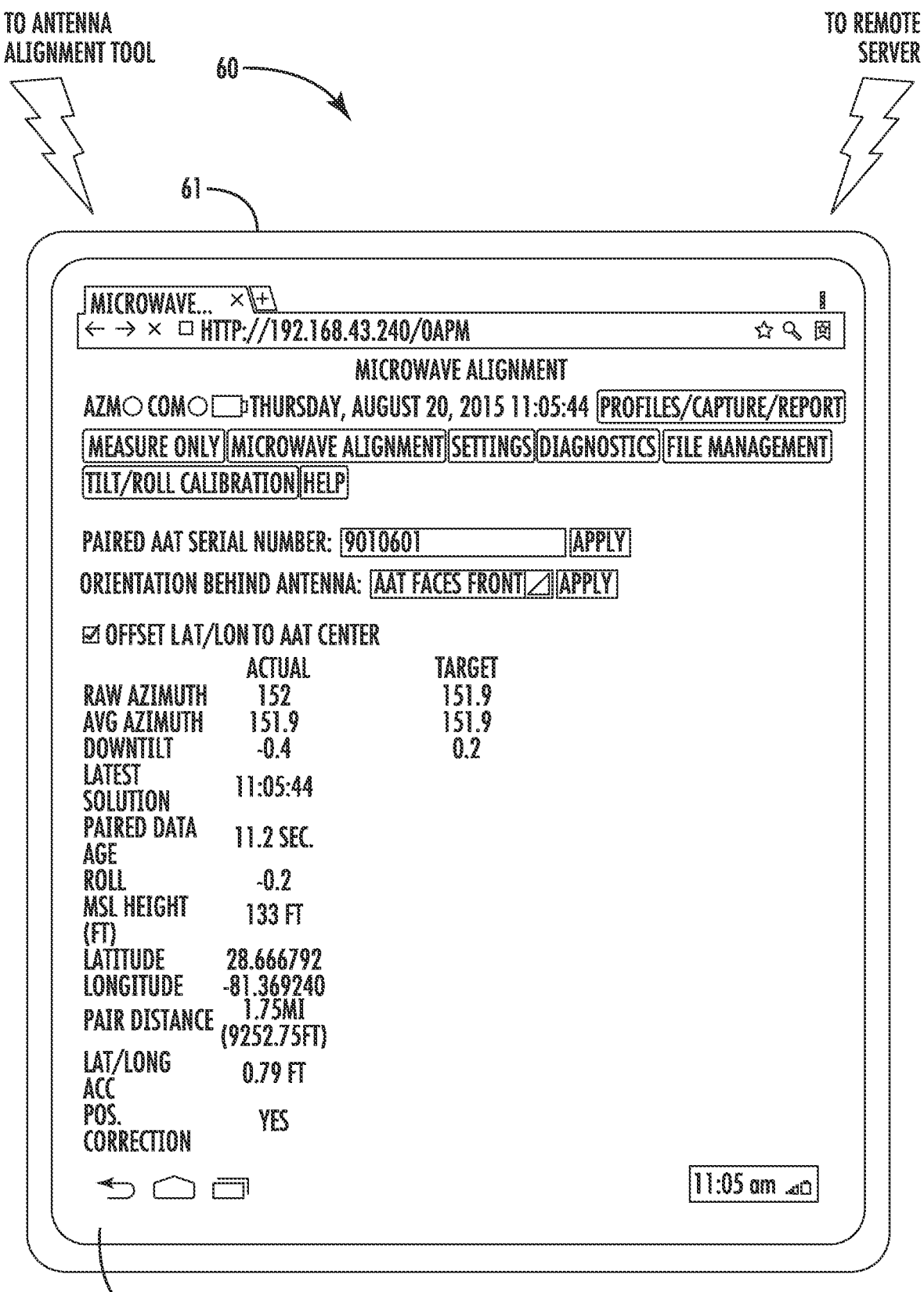
FIG. 4 is a diagram of a display of a technician tool of FIG. 1 during alignment.

The antenna alignment device 50 includes an alignment device housing 51 that illustratively has a generally elongate or rectangular shape (FIGS. 1 and 2). Of course, the alignment device housing 51 may be another shape. The antenna alignment device 50 also includes an alignment device processor 52 and an alignment device memory 53 carried by the device housing 51. The antenna alignment device 50 includes geographical position determining devices 54a, 54b carried by the device housing 51 at opposing ends thereof. The geographical position determining devices 54a, 54b may be global positioning system (GPS) receivers, for example, and cooperate with the alignment device processor 52 to determine actual position data for the given antenna 21, 22, for example, and may also cooperate to sense or measure azimuth (e.g. GPS-based compasses), tilt, roll and height (i.e. elevation, e.g. actual mean sea level (MSL) height), which, as will be appreciated by those skilled in the art, may all be highly desirable for increased accuracy alignment of the antennas. There may be any number of geographical position determining devices 54a, 54b (e.g., a single geographical position determining device) and the geographical position determining devices may be carried by the device housing at different locations. Moreover, while geographical position determining devices 54a, 54b are described, for example, as being GPS devices, it should be appreciated that other types of geographical position determining devices may be used, for example, a global navigation satellite system (GLONASS), or BeiDou navigation satellite system (BDS). Furthermore, it should be understood that the geographical position determining devices 54a, 54b may include physical antennas, receivers, either combined or multiple, and any associated circuitry, for example, RF front ends.

The antenna alignment device 50 also includes alignment device wireless communications circuitry 55 coupled to the processor 52. The alignment device wireless communications circuitry 55 may be cellular communication circuitry, for example. Alternatively or additionally, the alignment device wireless communications circuitry 55 may be WiFi, Bluetooth, near-field communication (NFC) or other relatively short range communications circuitry. The antenna alignment device 50 is advantageously battery powered (i.e., a battery is carried by the device housing 51), which may reduce hazards when positioned on one of the first and second antennas 21, 22. Of course, the antenna alignment device 50 may not be powered by a battery and may be powered alternatively or additionally from another power source. An example end-point alignment kit 40 is the AAT-15 available from Sunsight Instruments, LLC of Maitland, Fla.

The technician tool 60 is illustratively in the form of a ruggedized portable tablet computer and includes a portable housing 61 and a display 62 carried by the portable housing. Of course, the technician tool 60 may be in the form of another type of electronic device, for example, a laptop computer, a mobile phone, etc. The technician tool 60 may also be battery powered. Of course, the technician tool 60 may not be powered by a battery and may be powered alternatively or additionally from another power source. In some embodiments, the technician tool 60 may be carried by the antenna alignment device housing 51. In other words, the antenna alignment device housing 51 may carry the circuitry and/or display of the technician tool 60

The display 62 may be a touch screen display, for example. The technician tool 60 also includes a technician tool controller 63 coupled to the display 62. Technician tool wireless communications circuitry 64 is also carried by the portable housing 61 and coupled to the technician tool controller 63. The wireless communications circuitry 64 may be cellular, WiFi, Bluetooth, NFC, and/or another type of communications circuitry. The technician tool 60, in some embodiments, may include wired communications circuitry, for example, universal serial bus (USB), Ethernet, etc.

Figure 5:
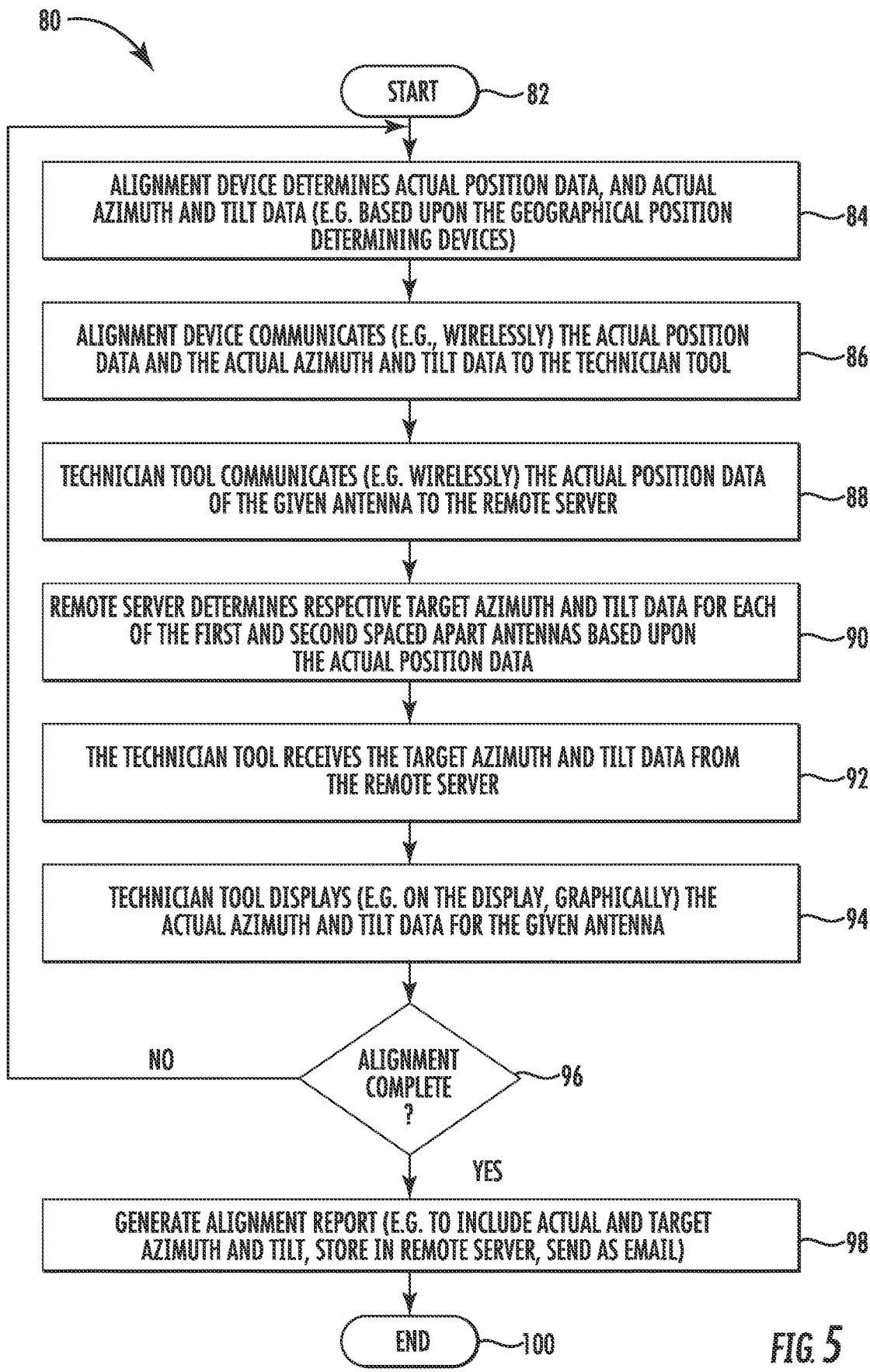
FIG. 5 is a flow chart illustrating operation of the alignment system of FIG. 1.

Referring now additionally to the flowchart 80 in FIG. 5, beginning at Block 82, operation of the antenna alignment system 20 will now be described. It should be understood by those skilled in the art that during operation of the antenna alignment system 20, "live" communication links between the first and second spaced apart antennas 21, 22 are not typically used. Of course, "live" communication links may be used. At Block 84, the alignment device processor 52 cooperates with the geographical position determining devices 54a, 54b to determine actual position data, and actual azimuth and tilt data for the given antenna 21, 22.

At Block 86, the alignment device processor 52 cooperates with the alignment device wireless communications circuitry 55 to wirelessly communicate the actual position data and the actual azimuth and tilt data to the technician tool 60 (e.g. via Bluetooth or WiFi), for example. In some embodiments, the actual position data and the actual azimuth and tilt data may be communicated through a wired interface to the technician tool 60. Upon receipt of the actual position data and the actual azimuth and tilt data from the antenna alignment device 50, e.g., via the technician tool wireless communications circuitry, the technician tool controller 63 cooperates with the technician tool wireless communications circuitry to wirelessly communicate the actual position data (e.g. via cellular or WiFi) for the given antenna 21, 22 to the remote server 30 (Block 88). Of course, the actual azimuth and tilt data may also be wirelessly communicated. In some embodiments, the actual position data and the actual azimuth and tilt data may be communicated to the remote server 30 via a wired interface. Moreover, in some embodiments, the actual position data may be communicated from the antenna alignment device 50.

The remote server 30, and more particularly, the remote server processor 31, upon receipt of the actual position data, determines respective target azimuth and tilt data for each of the first and second spaced apart antennas 21, 22 based upon actual position data of the first and second spaced apart antennas (Block 90). The actual position data and the actual azimuth and tilt data for either of the first and second spaced apart antenna 21, 22 may have been, prior to determining the respective target azimuth and tilt data, stored in the remote server memory 32, for example (i.e., a single end-point alignment kit is used by a single technician to provide actual position data, for example, in real-time; the actual position data from the second antenna may have be previously determined or may be determined in the future). Alternatively, the actual position data and the actual azimuth and tilt data for either or both of the first and second spaced apart antennas 21, 22 may be determined based upon real-time data being provided by a pair of end-point alignment kits 40 respectively at the first and second spaced apart antennas 21, 22 (i.e., two end-point alignment kits are being used by two technicians at the same time to provide actual position data, for example, in real-time).

The remote server 30, and more particularly, the remote server processor 31 sends the target azimuth and target tilt data to the technician tool 60. The technician tool 60, via the technician tool wireless communications circuitry 64, receives the target azimuth and tilt data from the remote server 30 (Block 92).

At Block 94, the technician tool 60 displays, on the display 62, the actual azimuth and tilt data for the given antenna 21, 22. More particularly, the technician tool 60 graphically displays the target azimuth and tilt data relative to the actual azimuth and tilt data, and/or relative to the Earth, for example, so that a tower technician can make azimuth and tilt adjustment to the given antenna 21, 22 for alignment. The display 62 may include a graphical representation (e.g., an indicator) and/or a numerical representation of the target azimuth and tilt data relative to the actual azimuth and tilt data. The display is updated, for example, in real-time, based upon the adjustments to an updated actual azimuth and tilt data. In other words, the communication process described above and the display of the target azimuth and tilt data relative to the actual azimuth and tilt data continues until a desired alignment. It will be appreciated by those skilled in the art that the antenna alignment system 20 may provide accuracy of ±0.4 degrees (R99) in azimuth and ±0.2 degrees in elevation angle.

Upon alignment or when desired (Block 96), for example, when the azimuth and tilt of the given antenna 21, 22 is within a threshold, the technician tool may be used to generate an alignment report. More particularly, the technician tool 60 may cooperate with the remote server 30 to generate and send (e.g., via email) an alignment report that includes the actual azimuth and tilt data and the target azimuth and tilt data (Block 98). Multiple reports may be merged into a single report, and/or the alignment report may include photographs or graphics, for example. The target azimuth and tilt data relative to the actual azimuth and tilt data are stored in the remote server memory 32, which may be used for generating and sending an alignment report, for example, at a later time. Problems that may occur as a result of improper data entry and/or incorrect path data sheets may also be reduced. In some embodiments, the technician tool 60 may generate a report without cooperation with the remote server 30.

The antenna alignment system 20 may further include an optional laser rangefinder that may be used to measure above ground level (AGL) height if desired. The method ends at Block 100.

As will be appreciated by those skilled in the art, typical present day alignment techniques involve picking visible landmarks somewhere between two end points and making an educated guess or estimate on where the other end would likely be, which may be particularly difficult as microwave links, for example, can be in the 40 mile range, which is beyond visible range. This present day guess and check method involves an increased amount of time on a tower moving the antenna back and forth in an attempt to find the other end of the link (both in azimuth and in tilt).

The above-described antenna alignment system 20 and method remove or significantly reduce the guess work and make the alignment a rote process. For example, the above-described antenna alignment system 20 and method may reduce an alignment process from about 4-16 hours to about 15 minutes, which results in increased labor savings. This may be a result of the wireless communications and the mounting arrangement of the antenna alignment device 50, as no break in any physical RF connections are necessary and neither waveguides, coaxial cables, and/or antenna mounted radios need to be removed from the tower. The antenna alignment system 20 also increases safety by limiting the amount of time technicians spend on the tower and makes a record of the alignment (the Federal Communications Commission (FCC) typically requires periodic alignment checking).

Figure 6:
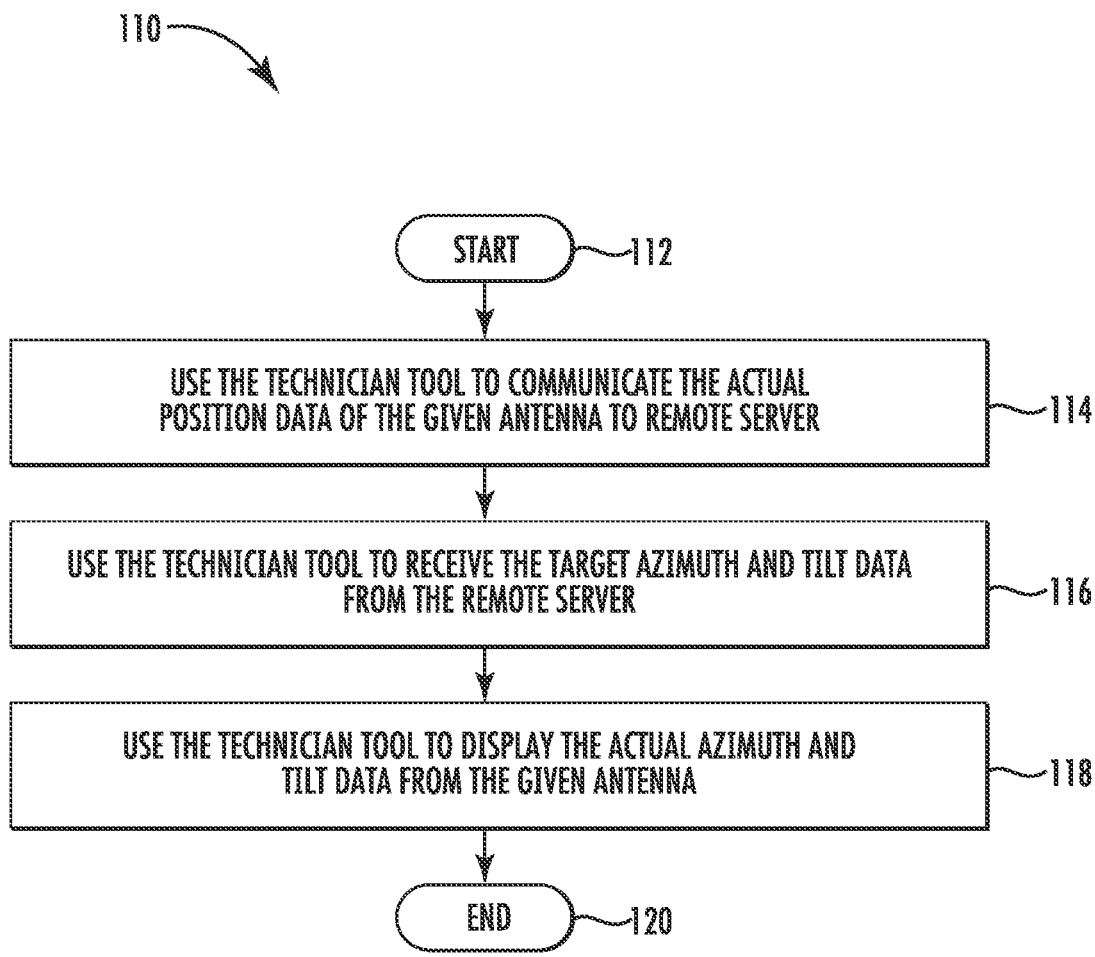
FIG. 6 is a flow chart illustrating a method of point to point alignment in accordance with an embodiment.
Figure 7:
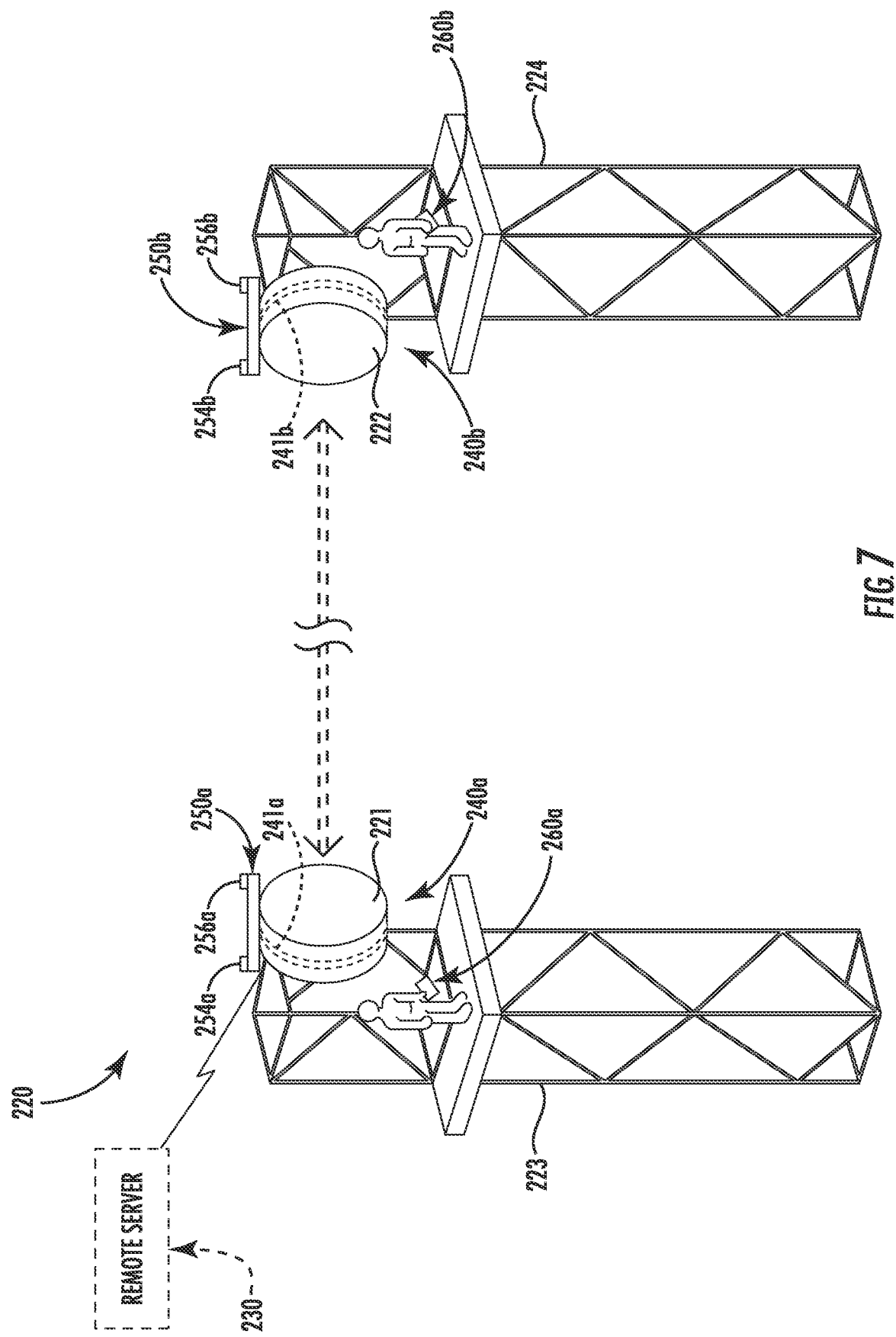
FIG. 7 is a schematic diagram of an alignment system in accordance with another embodiment.
Figure 8:
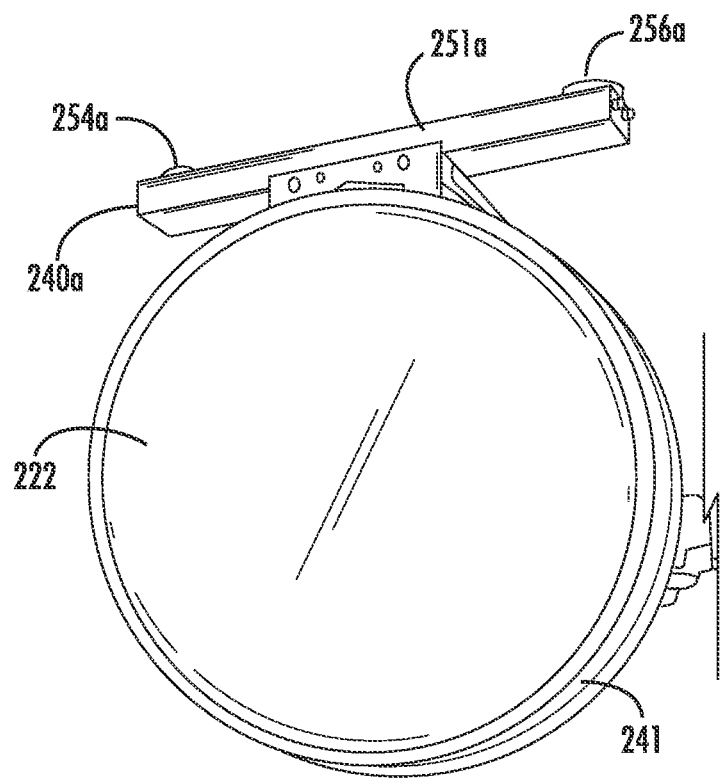
FIG. 8 is a diagram of an antenna alignment device of FIG. 7 mounted to an antenna.
Figure 9:
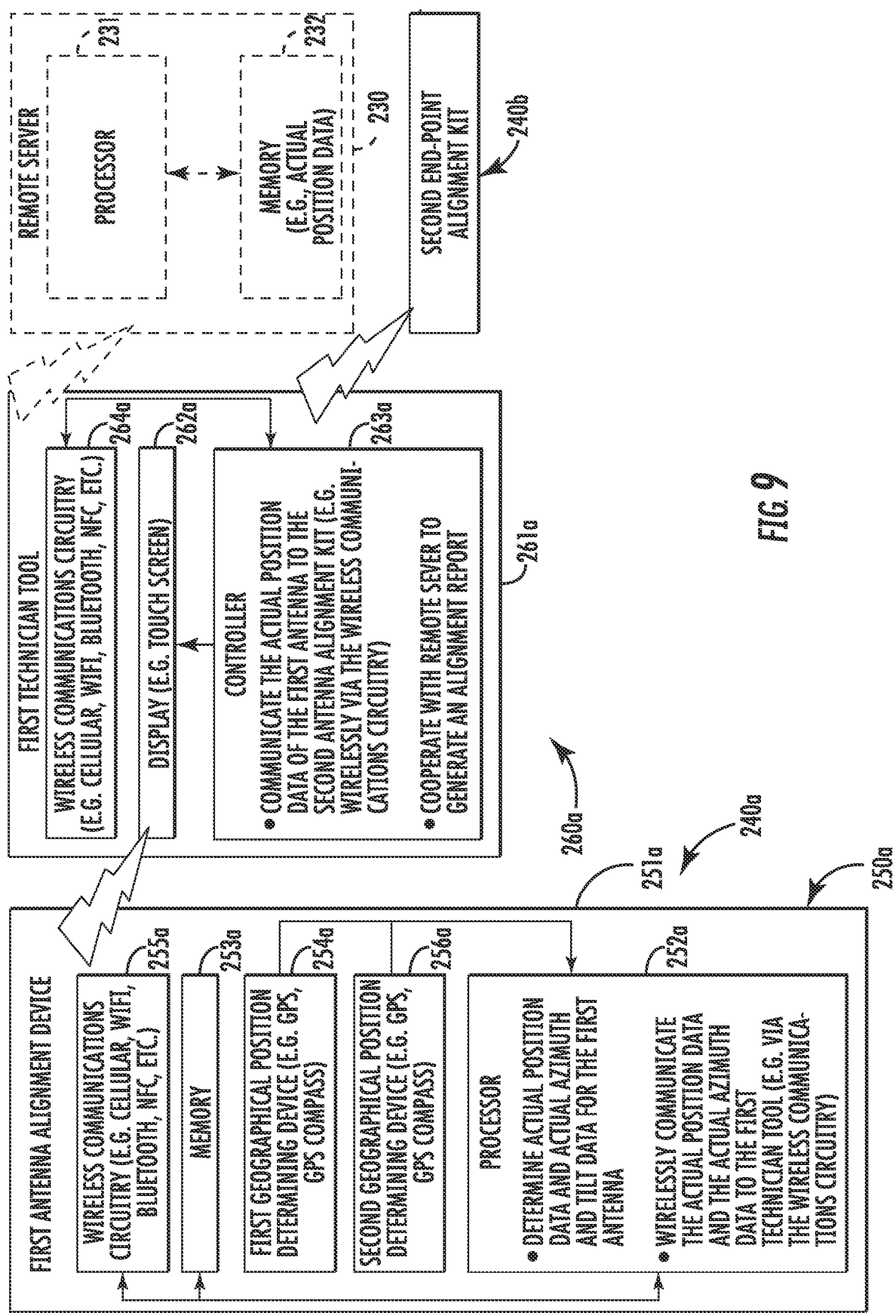
FIG. 9 is a schematic block diagram of a first end-point alignment kit in accordance with the embodiment of FIG. 7.
Figure 10:
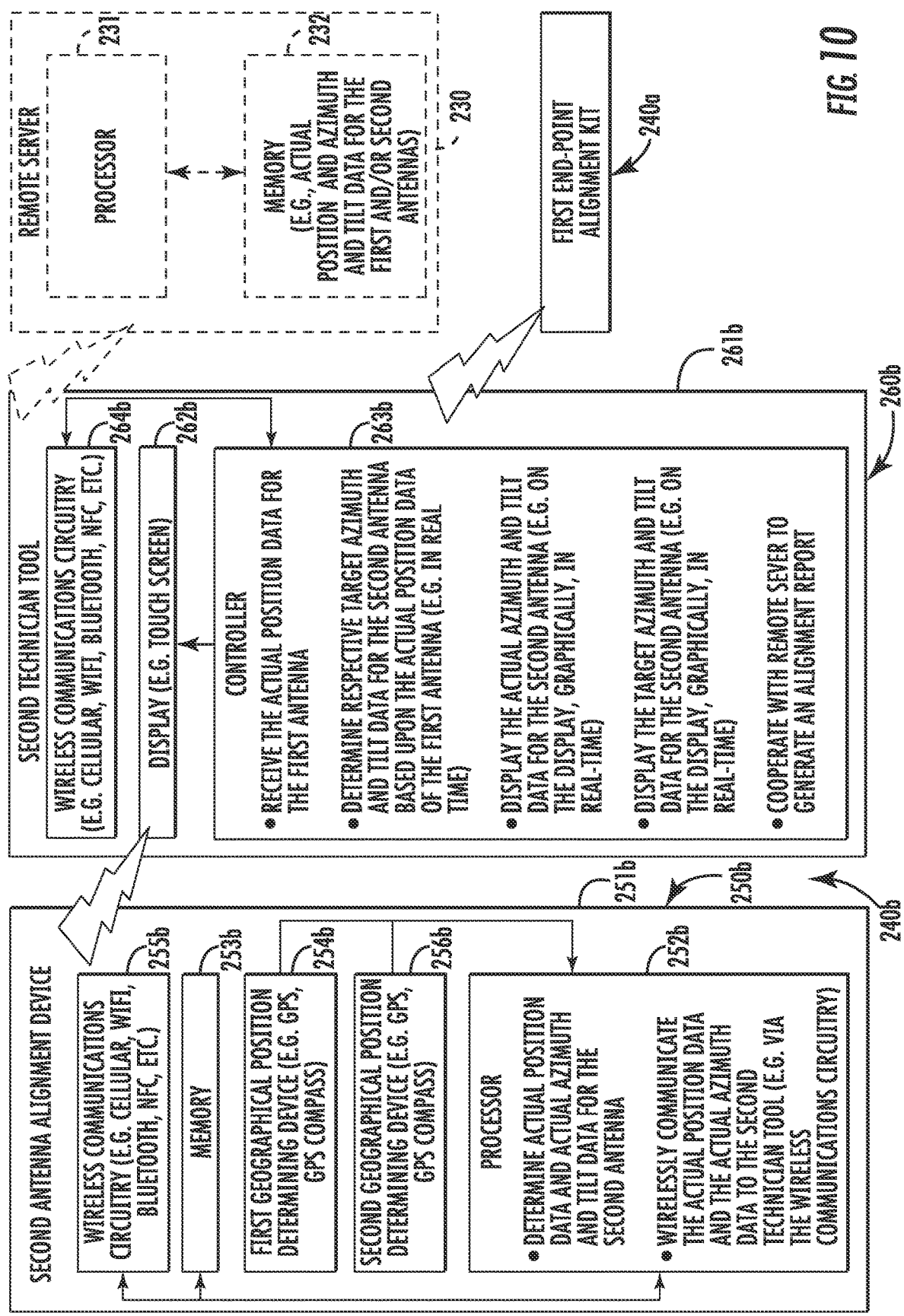
FIG. 10 is a schematic block diagram of a second end-point alignment kit in accordance with the embodiment of FIG. 7.
Figure 11:
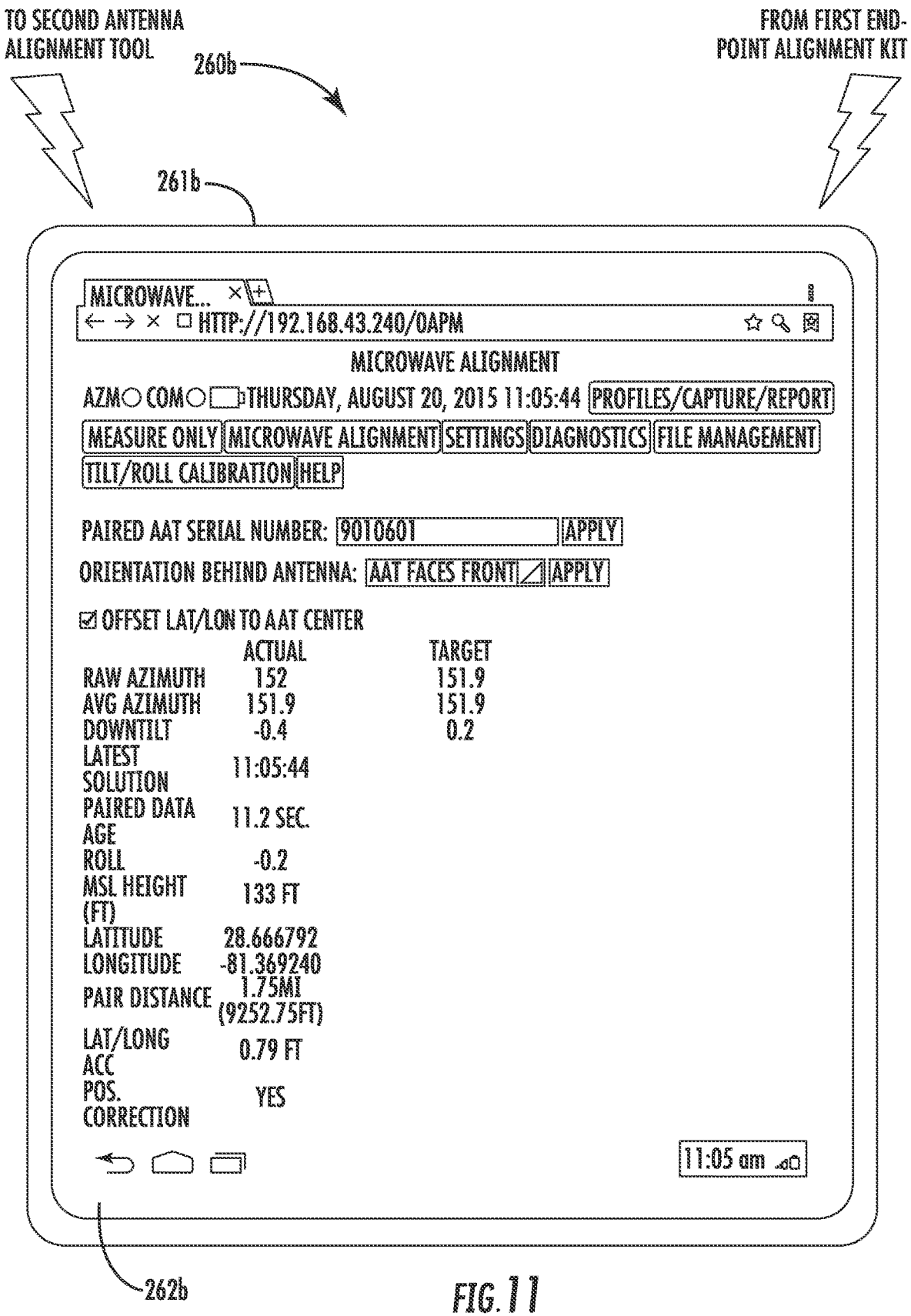
FIG. 11 is a diagram of a display of a technician tool of FIG. 7 during alignment.

Referring now to the flowchart 110 in FIG. 6, beginning at Block 112, a summary method includes, at Block 114, using the technician tool 60 to communicate the actual position data of the given antenna 21, 22 to the remote server 30. The method also includes using the technician tool 60 to receive the target azimuth and tilt data from the remote server 30 (Block 116) and using the technician tool to display the actual azimuth and tilt data from the given antenna 21, 22 (Block 118). The method ends at Block 120.

Referring now to FIGS. 7-11, in another embodiment, an alignment system 220 for point-to-point alignment of spaced apart first and second antennas 221, 222 carried by respective towers 223, 224, for example, includes first and second end-point alignment kits 240*a*, 240*b*. The first end-point alignment kit 240*a* includes a first antenna alignment device 250*a* to be temporarily mounted to the first antenna 221 during alignment, for example, by way of respective mounts 241*a*, 241*b*, as described above. The first antenna alignment device 250*a* may be secured to the first antenna 221 by any of the techniques described above, for example.

The first antenna alignment device 250*a* includes first alignment device housing 251*a* that illustratively has a generally elongate or rectangular shape, similar to the embodiments described above with respect to FIGS. 1 and 2. Of course, the first alignment device housing 251*a* may be another shape. The first antenna alignment device 250*a* also includes a first alignment device processor 252*a* and a first alignment device memory 253*a* carried by the first alignment device housing 251*a*. The first antenna alignment device 250*a* also includes first geographical position determining devices 254*a*, 256*a* carried by the first alignment device housing 251*a* at opposing ends thereof. The first geographical position determining devices 254*a*, 256*a* may be global positioning system (GPS) receivers, for example, or other type of geographical positioning system, as described above. The first geographical position determining devices 254*a*, 256*a* cooperate with the first alignment device processor 252*a* to determine actual position data for the first antenna 221, for example, and may also cooperate to sense or measure azimuth (e.g. GPS-based compasses), tilt, roll, and height, which, as will be appreciated by those skilled in the art, may all be highly desirable for increased accuracy alignment of the antennas. There may be any number of first geographical position determining devices 254*a*, 256*a* (e.g., a single geographical position determining device) and the geographical position determining devices may be carried by the first alignment device housing 251*a* at different locations.

The first antenna alignment device 250*a* also includes first alignment device wireless communications circuitry 255*a* coupled to the first alignment device processor 252*a*. The first alignment device wireless communications circuitry 255*a* may be cellular communication circuitry, for example. Alternatively or additionally, the first alignment device wireless communications circuitry 255*a* may be WiFi, Bluetooth, near-field communication (NFC) or other relatively short range communications circuitry. The first antenna alignment device 250*a* may be advantageously battery powered, for example, as described above.

The first antenna alignment system 220*a* also includes a first technician tool 260*a*. The first technician tool 260*a*, similarly to the embodiments described above, illustratively in the form of a ruggedized portable tablet computer and includes a first portable housing 261*a* and a first display 262*a* carried by the first portable housing. Of course, the first technician tool 260*a* may be in the form of another type of electronic device, for example, a laptop computer, a mobile phone, etc. The first technician tool 260*a* may also be battery powered. Of course, the first technician tool 260*a* may not be powered by a battery and may be powered alternatively or additionally from another power source.

The first display 262*a* may be a touch screen display, for example. The first technician tool 260*a* also includes a first technician tool controller 263*a* coupled to the first display 262*a*. First technician tool wireless communications circuitry 264*a* is also carried by the first portable housing 261*a* and coupled to the first technician tool controller 263*a*. The first wireless communications circuitry 264*a* may be cellular, WiFi, Bluetooth, NFC, and/or another type of communications circuitry. The first technician tool controller 263*a* cooperates with the first technician tool wireless communications circuitry 264*a* to communicate the actual position data of the first antenna 221 to the second end-point alignment kit 240*b*. The first technician tool 260*a* may be carried by the first antenna alignment device housing 251*a*. In other words, the first antenna alignment device housing 251*a* may carry the circuitry and/or display of the first technician tool 260*a*.

The second end-point alignment kit 240b includes a second antenna alignment device 250b to be temporarily mounted to the second antenna 222 during alignment. The second antenna alignment device 250b may be secured to the second antenna 222 by any of the techniques described above, for example.

The second antenna alignment device 250b includes second alignment device housing 251b that illustratively has a generally elongate or rectangular shape, similar to the embodiments described above with respect to FIGS. 1 and 2. Of course, the second alignment device housing 251b may be another shape. The second antenna alignment device 250b also includes a second alignment device processor 252b and a second alignment device memory 253b carried by the second alignment device housing 251b.

The second antenna alignment device 250b also includes second geographical position determining devices 254b, 256b carried by the second alignment device housing 251b at opposing ends thereof. The second geographical position determining devices 254b, 256b may be global positioning system (GPS) receivers, for example, or other type of geographical positioning system, as described above. The second geographical position determining devices 254b, 256b cooperate with the second alignment device processor 252b to determine actual position data for the second antenna 222, for example, and may also cooperate to sense or measure azimuth (e.g. GPS-based compasses), tilt, roll, and height, which, as will be appreciated by those skilled in the art, may all be highly desirable for increased accuracy alignment of the antennas. There may be any number of second geographical position determining devices 254b, 256b (e.g., a single geographical position determining device) and the geographical position determining devices may be carried by the second alignment device housing 251b at different locations.

The second antenna alignment device 250b also includes second alignment device wireless communications circuitry 255b coupled to the second alignment device processor 252b. The second alignment device wireless communications circuitry 255b may be cellular communication circuitry, for example. Alternatively or additionally, the second alignment device wireless communications circuitry 255b may be WiFi, Bluetooth, near-field communication (NFC) or other relatively short range communications circuitry. The second alignment device wireless communications circuitry 255b cooperates to communicate the actual position data and actual azimuth and tilt data for the second antenna to a second technician tool 260b of the second antenna alignment system 220b.

The second technician tool 260b, similarly to the embodiments described above, is illustratively in the form of a ruggedized portable tablet computer and includes a portable housing 261b and a display 262b carried by the portable housing. Of course, the second technician tool 260b may be in the form of another type of electronic device, for example, a laptop computer, a mobile phone, etc. The second technician tool 260b may also be battery powered. Of course, the second technician tool 260b may not be powered by a battery and may be powered alternatively or additionally from another power source.

The display 262b may be a touch screen display, for example. The second technician tool 260b also includes a second technician tool controller 263b coupled to the display 262b. Second technician tool wireless communications circuitry 264b is also carried by the portable housing 261b and coupled to the second technician tool controller 263b. The second technician tool wireless communications circuitry 264b may be cellular, WiFi, and/or another type of communications circuitry.

The second technician tool controller 263b cooperates with the second technician tool wireless communications circuitry 264b to wirelessly receive the actual position data and actual azimuth and tilt data for the first antenna 221. The second technician tool controller 263b determines respective target azimuth and tilt data for the second antenna 222 based upon the actual position data of the first antenna 221. The second technician tool controller 263b displays, via the display 262b, the actual azimuth and tilt data for the second antenna 222. Similar to that described above with respect to the first antenna alignment device and technician tool 250a, 260a, the second technician tool 260b may be carried by the second antenna alignment device housing 251b. In other words, the second antenna alignment device housing 251b may carry the circuitry and/or display of the second technician tool 260b.

It should be noted that, in some embodiments, a remote server 230, for example, may facilitate communications or relay communications between the first and second end-point alignment kits 240a, 240b. The remote server 230, which is similar to that remote server described above with respect to the embodiments in FIGS. 1-4, may also store target and actual position and azimuth and tilt data for the first and second antennas 221, 222, but does not perform any calculations for determining the target azimuth and tilt data for the second antenna. The remote server 230 may also generate and send reports, for example, alignment reports, as described above.

Figure 12:
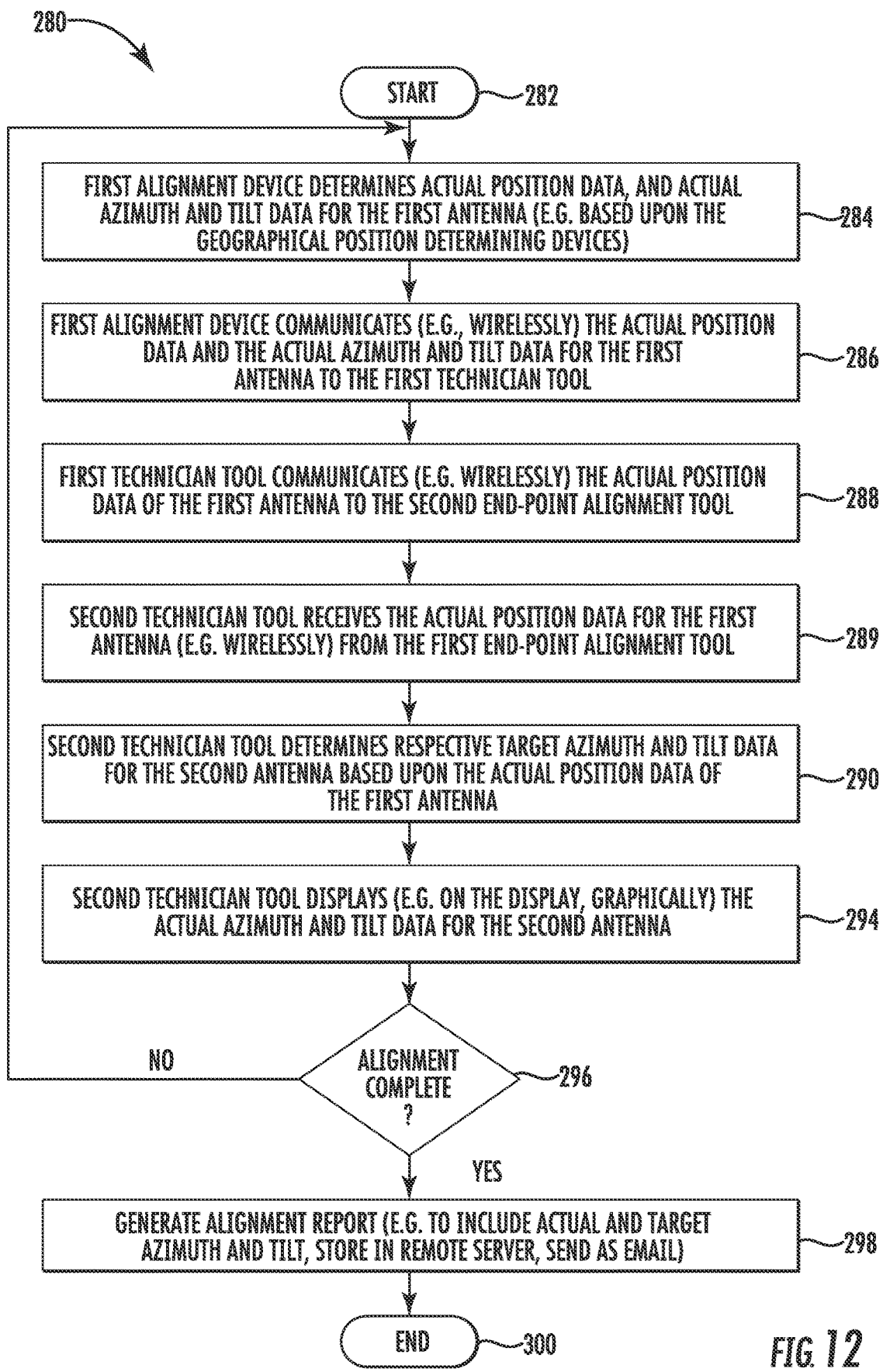
FIG. 12 is a flow chart illustrating operation of the alignment system of FIG. 7.

Referring now additionally to the flowchart 280 in FIG. 12, beginning at Block 282, operation of the antenna alignment system 220 will now be described. At Block 284, the first alignment device processor 252a cooperates with the geographical position determining devices 254a, 256a to determine actual position data, and actual azimuth and tilt data for the first antenna 221.

At Block 286, the first alignment device processor 252a cooperates with the alignment device wireless communications circuitry 255a to wirelessly communicate the actual position data and the actual azimuth and tilt data to the first technician tool 260a (e.g. via Bluetooth or WiFi), for example. In some embodiments, the actual position data and the actual azimuth and tilt data may be communicated through a wired interface to the technician tool 260a. Upon receipt of the actual position data and the actual azimuth and tilt data from the first antenna alignment device 250a, e.g., via the first technician tool wireless communications circuitry 264a, the first technician tool controller 263a cooperates with the technician tool wireless communications circuitry to wirelessly communicate the actual position data (e.g. via cellular or WiFi) of the first antenna 221 to the second end-point alignment kit 240b (Block 288). Of course, the actual azimuth and tilt data may also be wirelessly communicated. In some embodiments, the remote server 230, as described above, may be used to relay or facilitate communications between the first and second end-point alignment kits 240a, 240b (i.e., without performing any calculations thereon). Moreover, in some embodiments, the actual position data may be communicated from the antenna alignment devices 250a, 250b.

The second technician tool 260b, and more particularly, second technician tool controller 263b, cooperates with the second technician tool wireless communications circuitry 264b to receives the actual position data for the first antenna 221 (Block 289). The second technician tool controller 263*b*, upon receipt of the actual position data, determines respective target azimuth and tilt data for the second antenna 222 based upon actual position data of the first antenna 221 (Block 290). The receipt of the actual position data of the first antenna 221 and the determining of the target azimuth and tilt of the second antenna 222 may be performed in near real-time (i.e., two end-point alignment kits are being used by two technicians at the same time to provide actual position data, for example, in real-time).

At Block 294, the second technician tool 260*b* displays, on the display 262*b*, the actual azimuth and tilt data for the second antenna 222. More particularly, the second technician tool 260*b* graphically displays the target azimuth and tilt data, for example, relative to the actual azimuth and tilt data and/or relative to the Earth, so that a tower technician can make azimuth and tilt adjustment to the second antenna 222 for alignment. The display 262*b* may include a graphical representation (e.g., an indicator) and/or a numerical representation of the target azimuth and tilt data relative to the actual azimuth and tilt data and/or relative to the Earth, for example. The display 262*b* may be updated, for example, in real-time, based upon the adjustments to an updated actual azimuth and tilt data. In other words, the communication process described above and the display of the target azimuth and tilt data continues until a desired alignment.

Upon alignment or when desired (Block 296), for example, when the azimuth and tilt of the second antenna 222 is within a threshold, the second technician tool 260*b* may be used to generate an alignment report. More particularly, the second technician tool 260*b* may cooperate with a remote server 230 to generate and send (e.g., via email) an alignment report that includes the actual azimuth and tilt data and the target azimuth and tilt data of the second antenna 222 (Block 298). Multiple reports may be merged into a single report, and/or the alignment report may include photographs or graphics, for example. The target azimuth and tilt data, for example, relative to the actual azimuth and tilt data for the second antenna 222 are stored in the remote server memory 232 that is coupled to a remote server processor 231 and which may be used for generating and sending an alignment report, for example, at a later time. The actual azimuth and tilt data, and position data, may also be stored in the memory 232 of the remote server 230. Problems that may occur as a result of improper data entry and/or incorrect path data sheets may also be reduced. The method ends at Block 300.

Figure 13:
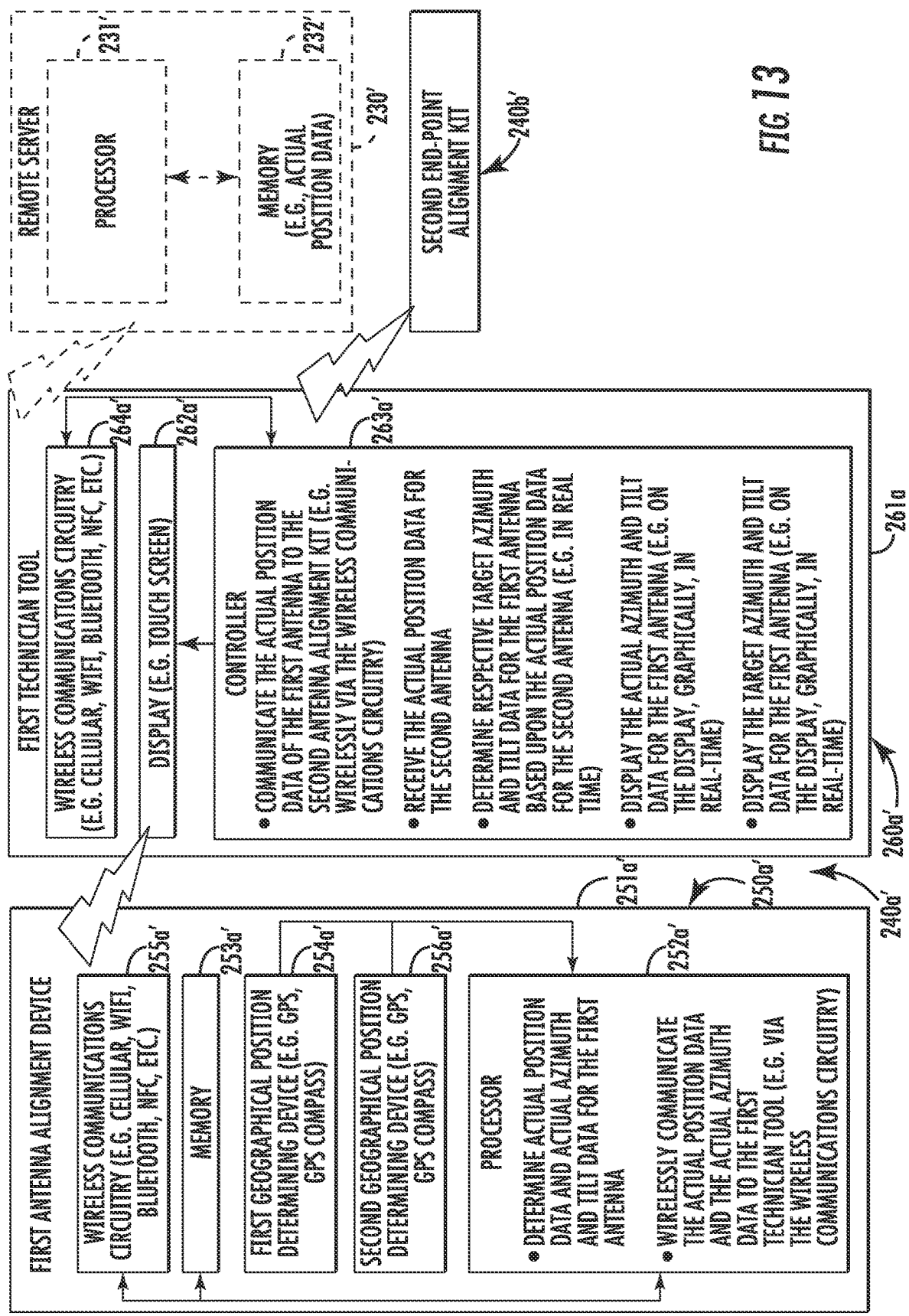
FIG. 13 is a schematic block diagram of a first end-point alignment kit of another embodiment of alignment system.
Figure 14:
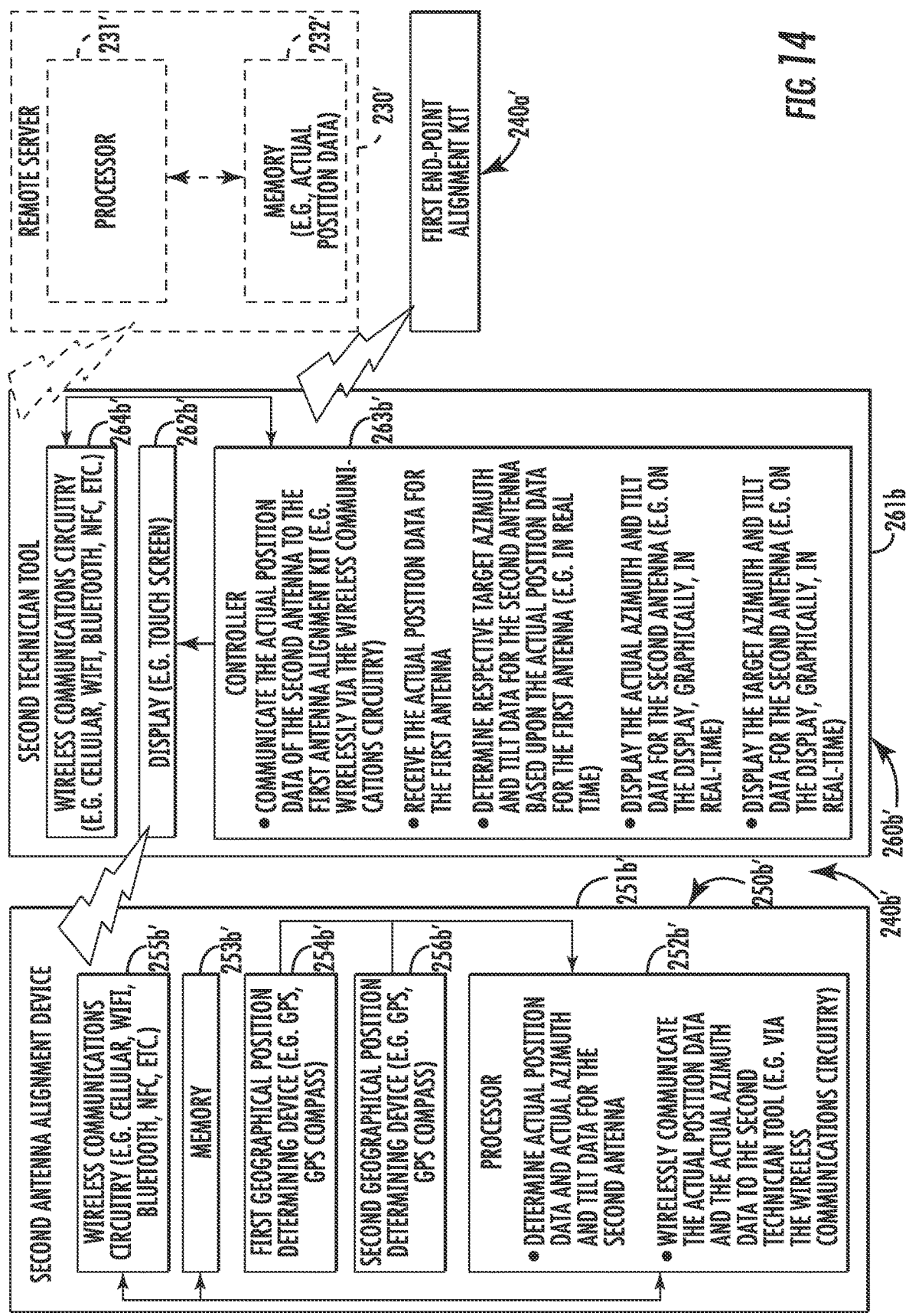
FIG. 14 is a schematic block diagram of a second end-point alignment kit for use with the first end-point alignment kit in FIG. 13.

Referring now to FIGS. 13-14, in another embodiment, the second technician tool 260*b*' communicates the actual position data of the second antenna 222' to the first end-point alignment kit 240*a*'. The first technician tool 260*a*' receives the actual position data for the second antenna 222' and determines the respective target azimuth and tilt data for the first antenna 221' based upon the actual position data of the second antenna 222'. The first technician tool 260*a*' also displays the actual azimuth and tilt data for the second antenna 222'. In other words, the alignment system 220' is bi-directional in that each of the first and second end-point alignment units 240*a*', 240*b*' includes both the functionality of the first and second end-point alignment units described in the above embodiments (i.e., the first and second end-point alignment units are functionally equivalent with respect to the given first or second antenna 221', 222').

Figure 15:
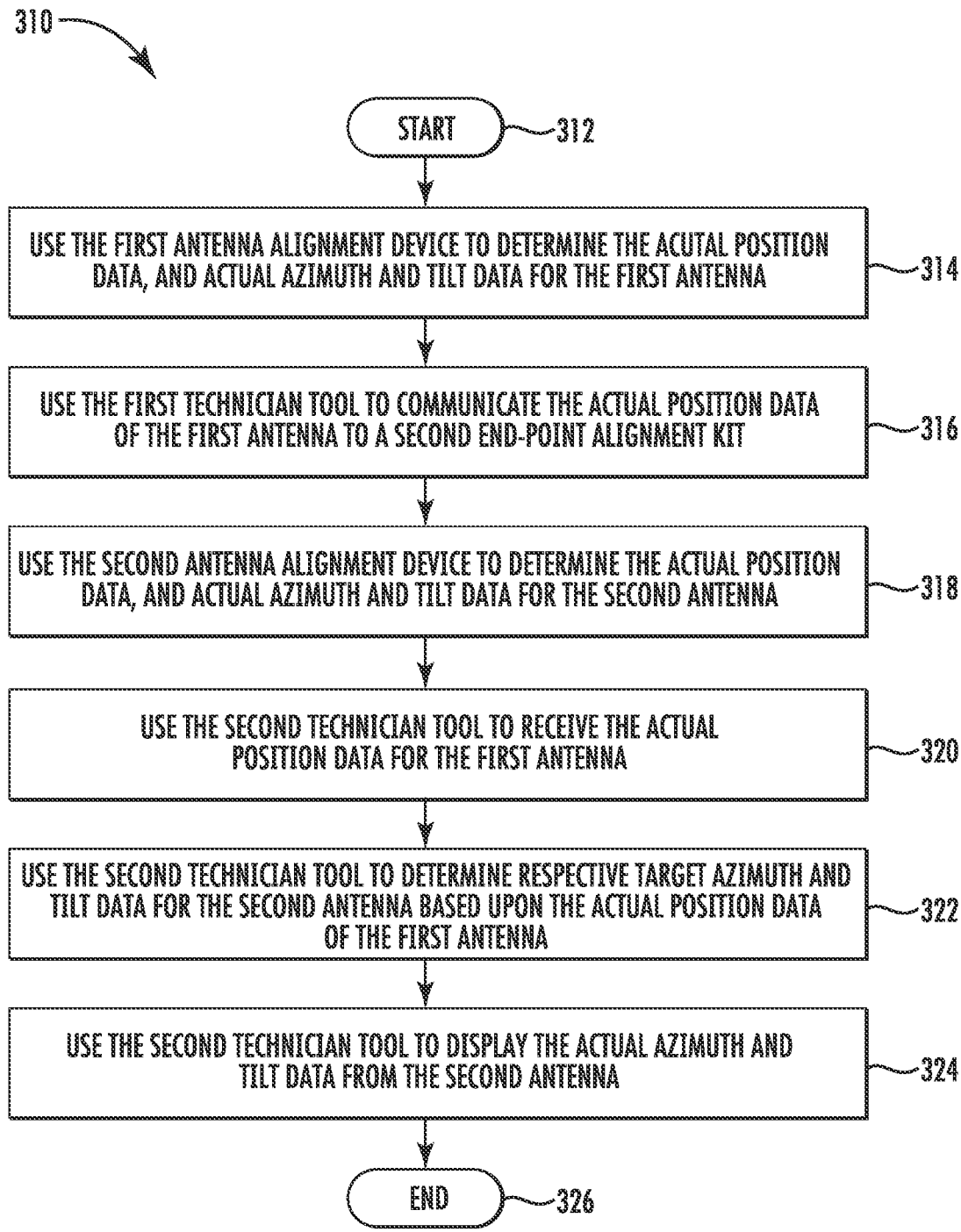
FIG. 15 is a flow chart illustrating a method of point to point alignment in accordance with an embodiment.

Referring now to the flowchart 310 in FIG. 15, beginning at Block 312, a summary method of point-to-point alignment includes, at Block 314, using the first antenna alignment device 250*a* of the first end-point alignment kit 240*a* to determine the actual position data, and actual azimuth and tilt data for the first antenna 221. The method also includes using the first technician tool 260*a* of the first end-point alignment kit 240*a* to communicate the actual position data of the first antenna to a second end-point alignment kit 240*b* (Block 316). The method also includes using the second antenna alignment device 250*b* of the second end-point alignment kit 240*b* to determine the actual position data, and actual azimuth and tilt data for the second antenna 222 (Block 318). The method includes using the second technician tool 260*b* of the second end-point alignment kit 240*b* to receive the actual position data for the first antenna 221 (Block 320), determine respective target azimuth and tilt data for the second antenna 222 based upon the actual position data of the first antenna (Block 322), and display the actual azimuth and tilt data for the second antenna (Block 324). The method ends at Block 326.

In some embodiments, any of the first and second end-point alignment kits 240*a*, 240*b* associated with a given antenna 221, 222 may communicate with the remote server 230 or have loaded therein (e.g. prior to) the actual position data and actual target and azimuth data for the other antenna. The first or second end-point alignment kit 240*a*, 240*b* may then, based upon the actual position data, determine the respective target azimuth and tilt data for the other antenna 221, 222 and display the azimuth and tilt data for the given antenna.

Figure 16:
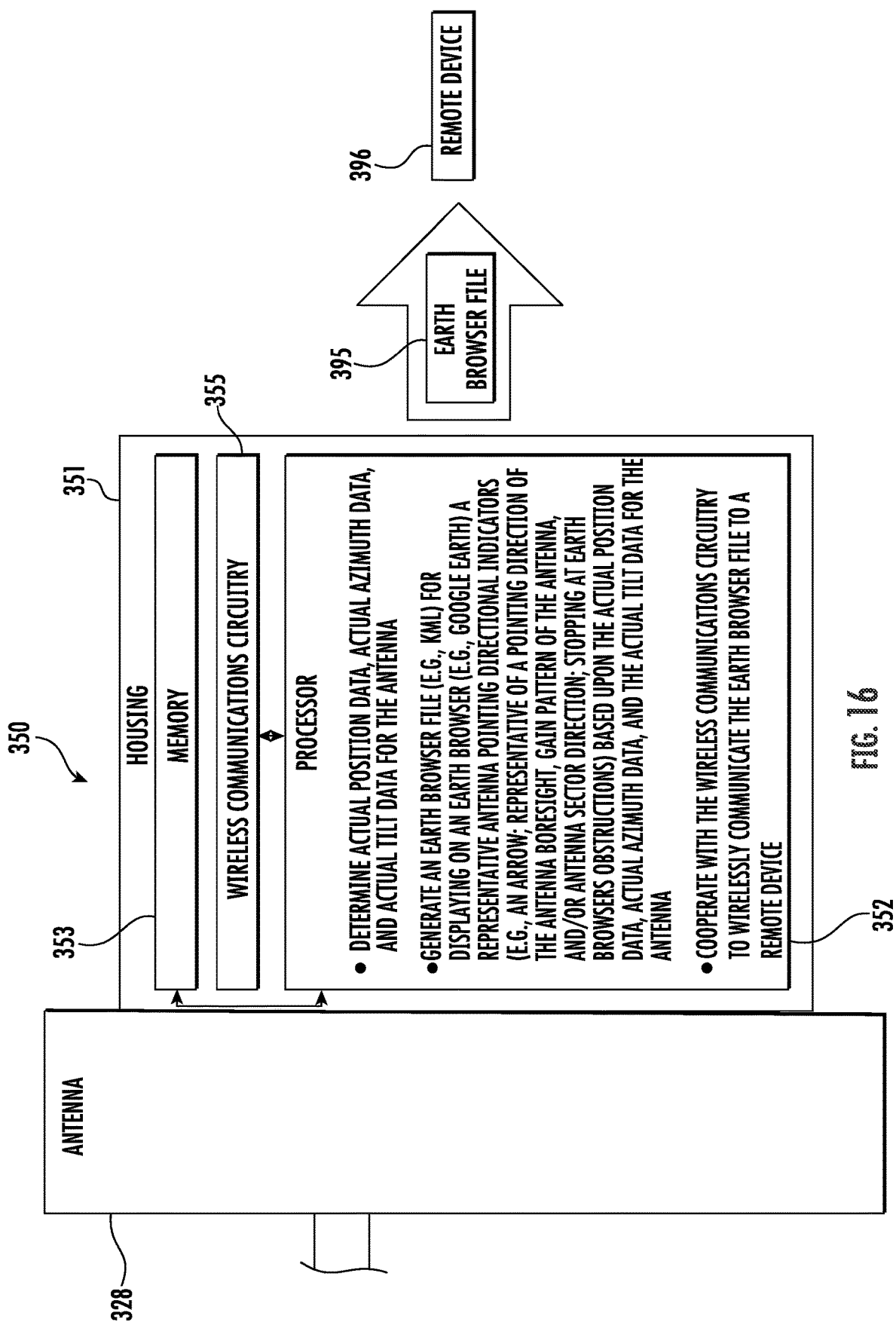
FIG. 16 is a schematic diagram of an antenna alignment tool according to an embodiment.
Figure 17:
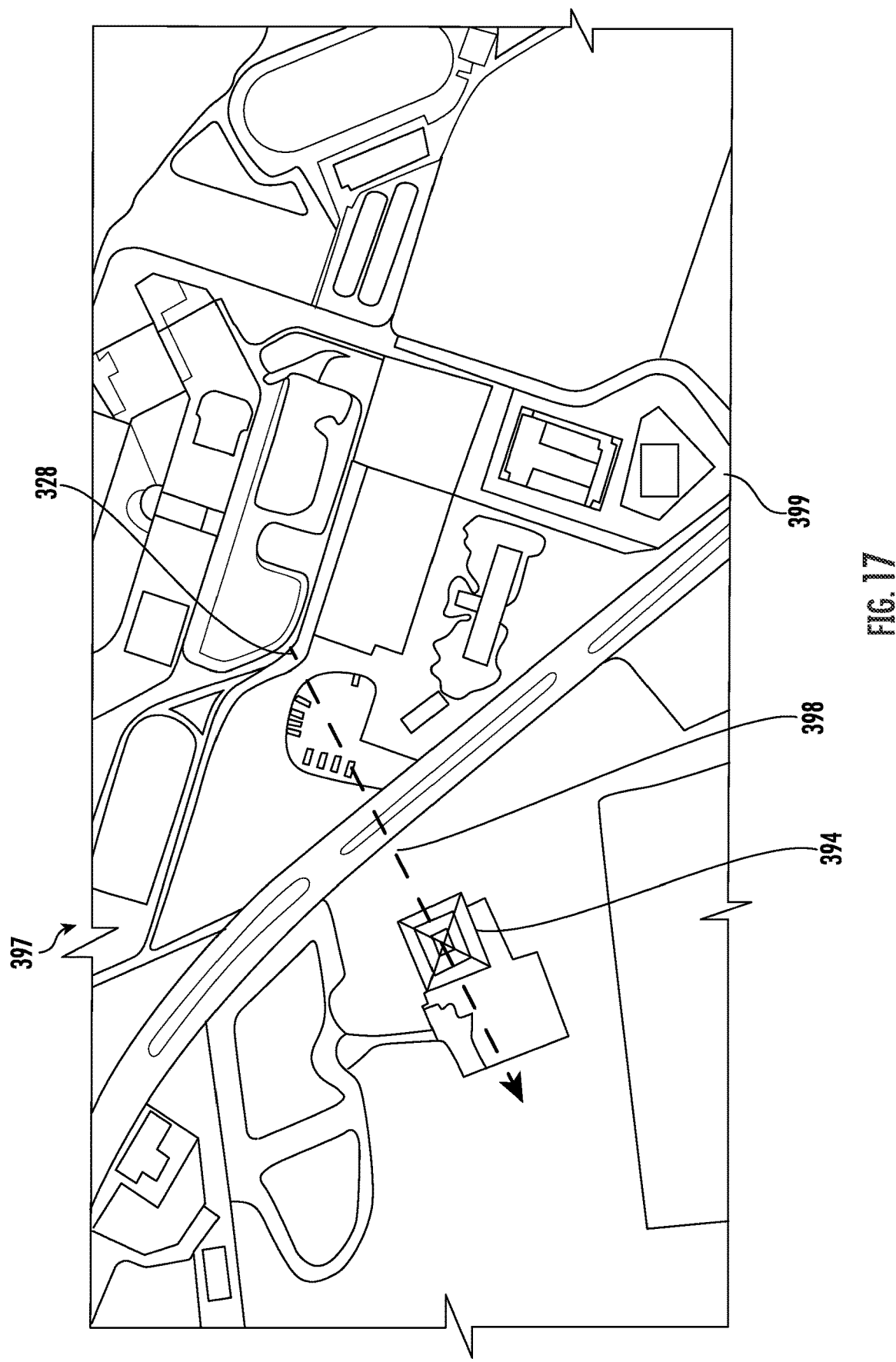
FIG. 17 is an earth browser displaying a representative antenna pointing directional indicator generated by the antenna alignment tool of FIG. 16.

Referring now to FIGS. 16 and 17, in another embodiment, an antenna alignment tool 350 illustratively includes a housing 351 to be temporarily mounted to an antenna 328 during alignment. The antenna 328 may be a cellular antenna, for example, and have an antenna boresight associated therewith. The antenna 328 may be another type of antenna. The housing 351 may be considered a portable housing, for example, based upon the temporary mounting, which may permit the antenna alignment tool 350 to be moved and mounted among different antennas.

The antenna alignment tool 350 includes a processor 352 and a memory 353 carried by the housing 351. Similarly to any of the antenna alignment devices described above, the antenna alignment tool 350 may also include one or more geographical position determining devices (e.g., GPS receivers) and wireless communications circuitry 355 carried by the housing 351 and coupled to the processor 352.

The processor 352 determines actual position data, actual azimuth data, and actual tilt data for the antenna 328. More particularly, the processor 352 may cooperate with the geographical position determining devices 354 to determine the actual position data, actual azimuth data, and actual tilt data for the antenna 328. The processor 352 may also determine actual roll data and actual height data (e.g., mean sea level (MSL) data or above ground level (AGL) data) for the antenna 328. The processor 352 may also determine other and/or additional types of data for the antenna 328.

Figure 18:
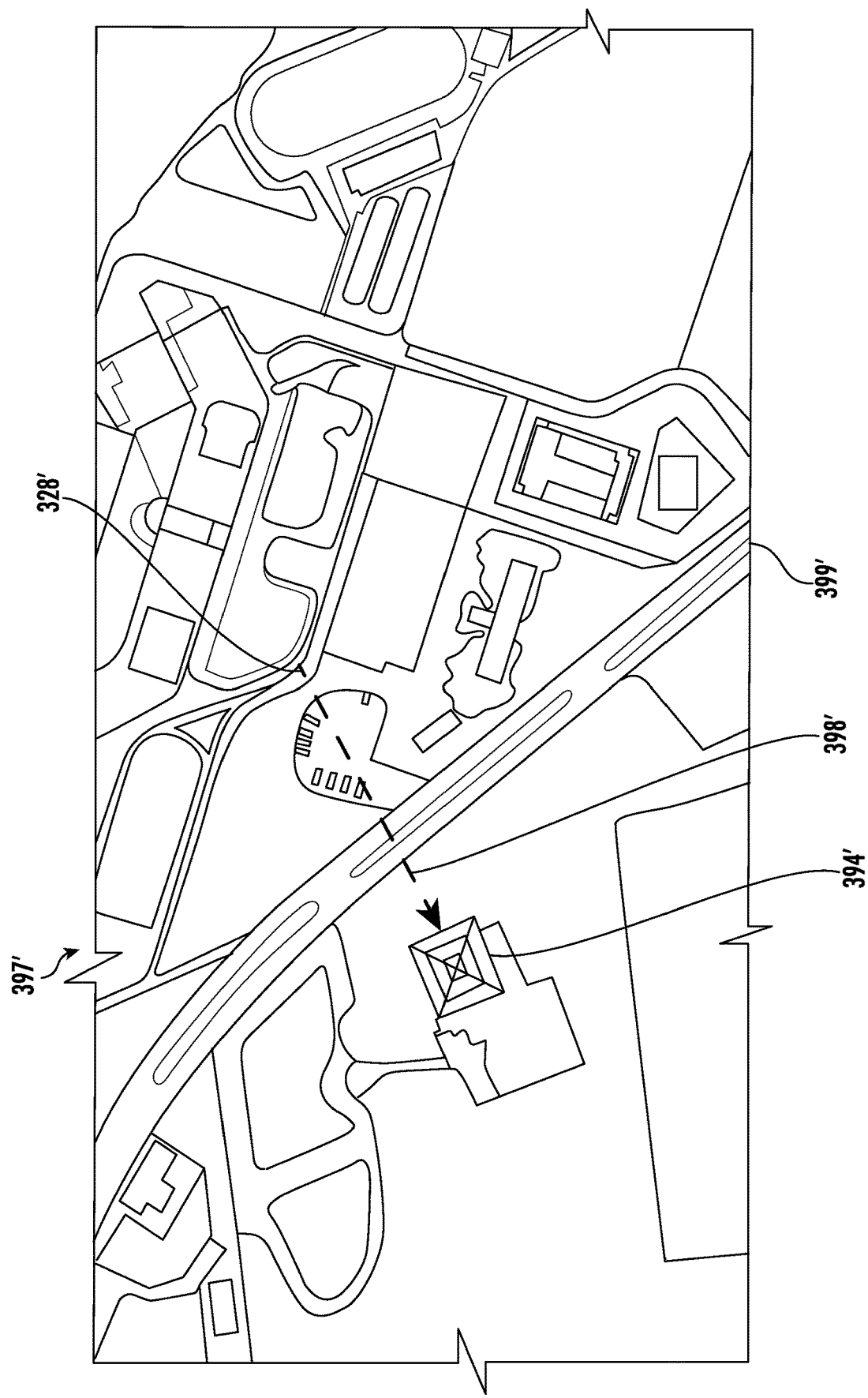
FIG. 18 is an earth browser displaying a representative antenna pointing directional indicator generated by an antenna alignment tool in accordance with another embodiment.

The processor 352 also generates an earth browser file 395, for example, a keyhole markup language (KML) file. The earth browser file 395 is for displaying on earth browser 397, for example, Google Earth, a representative antenna pointing directional indicator 398 based upon the actual position data, actual azimuth data, and the actual tilt data for the antenna 328. The processor 352 may also generate the earth browser file 395 based upon any of the actual roll data and/or the actual height data. The representative antenna pointing directional indicator 398 is illustratively overlaid onto geographical scenery 399 at the geographic location of the antenna 328. The representative antenna pointing directional indicator is representative of a pointing direction of the antenna boresight and is illustratively in the form of an arrow 398. Of course, the representative antenna pointing directional indicator 398 may be in another form. The arrow 398 illustratively has a visual characteristic associated therewith. For example, the arrow 398 may be displayed in a certain color or have a certain shape (e.g., dashed). The arrow 398 may have more than one visual characteristic. The arrow 398 may also be displayed to have a length based upon the antenna parameters or that is user settable, for example. Illustratively, the arrow 398 changes visual characteristics (e.g., dashing type) based upon an earth browser obstruction 394 (e.g., a building). The arrow 398 may have another visual characteristic, as will be appreciated by those skilled in the art. In another embodiment, the arrow 398' may stop at the earth browser obstruction 394' (FIG. 18). In some embodiments, the arrow 398' may continue beyond the earth browser obstruction 394'. In other words, arrow 398' may break at the earth browser obstruction 394' and continue beyond the earth browser obstruction.

The processor 352 may cooperate with the wireless communications circuitry 355 to wirelessly communicate the earth browser file 395 to a remote device 396. The remote device 396 may be a technician tool, as described above, a cloud storage device, or another remote device. Those skilled in the art will appreciate that the remote device 396 may be physically adjacent the antenna alignment tool 350, for example, outside the housing 351.

Figure 19:
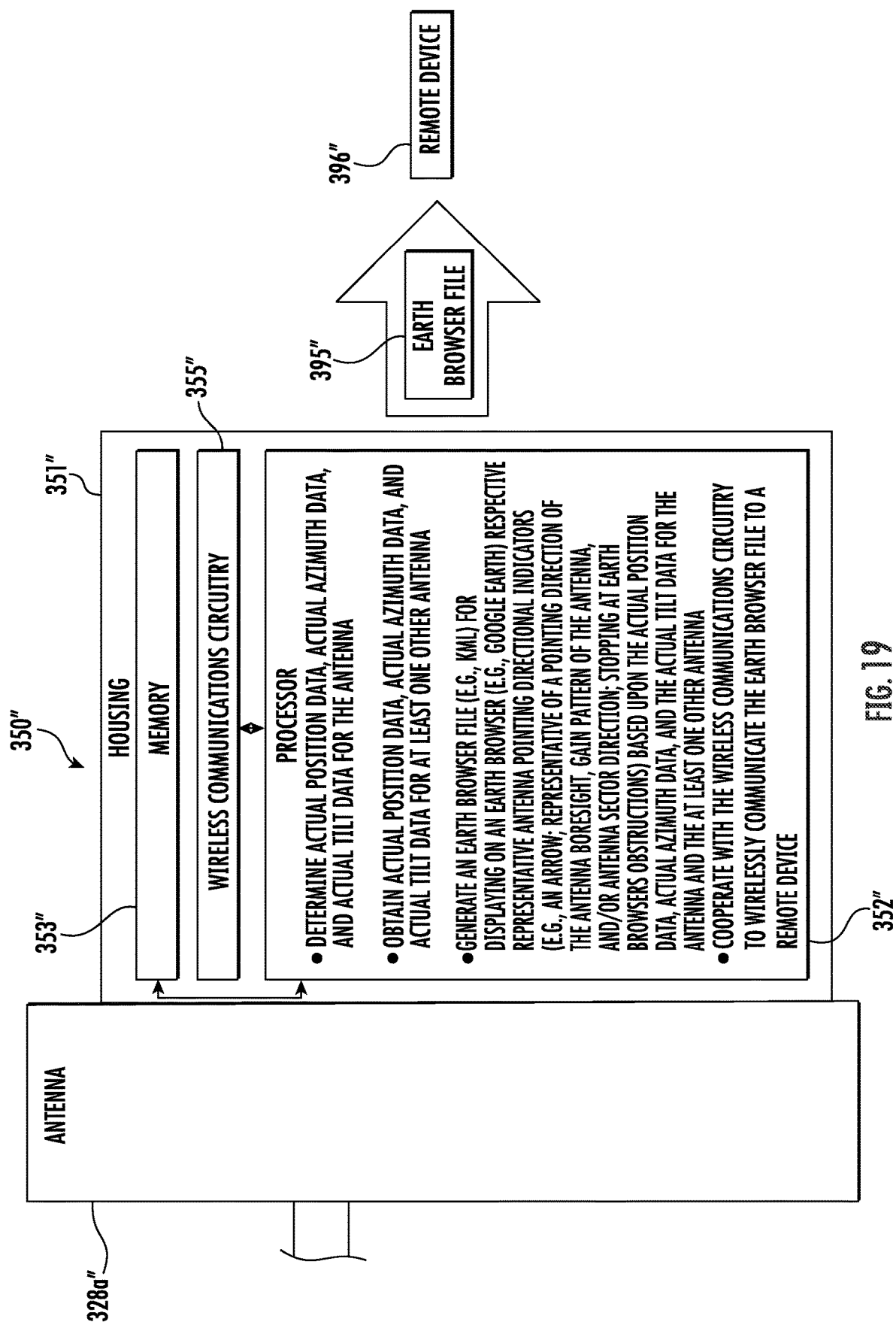
FIG. 19 is a schematic diagram of an antenna alignment tool according to another embodiment.
Figure 20:
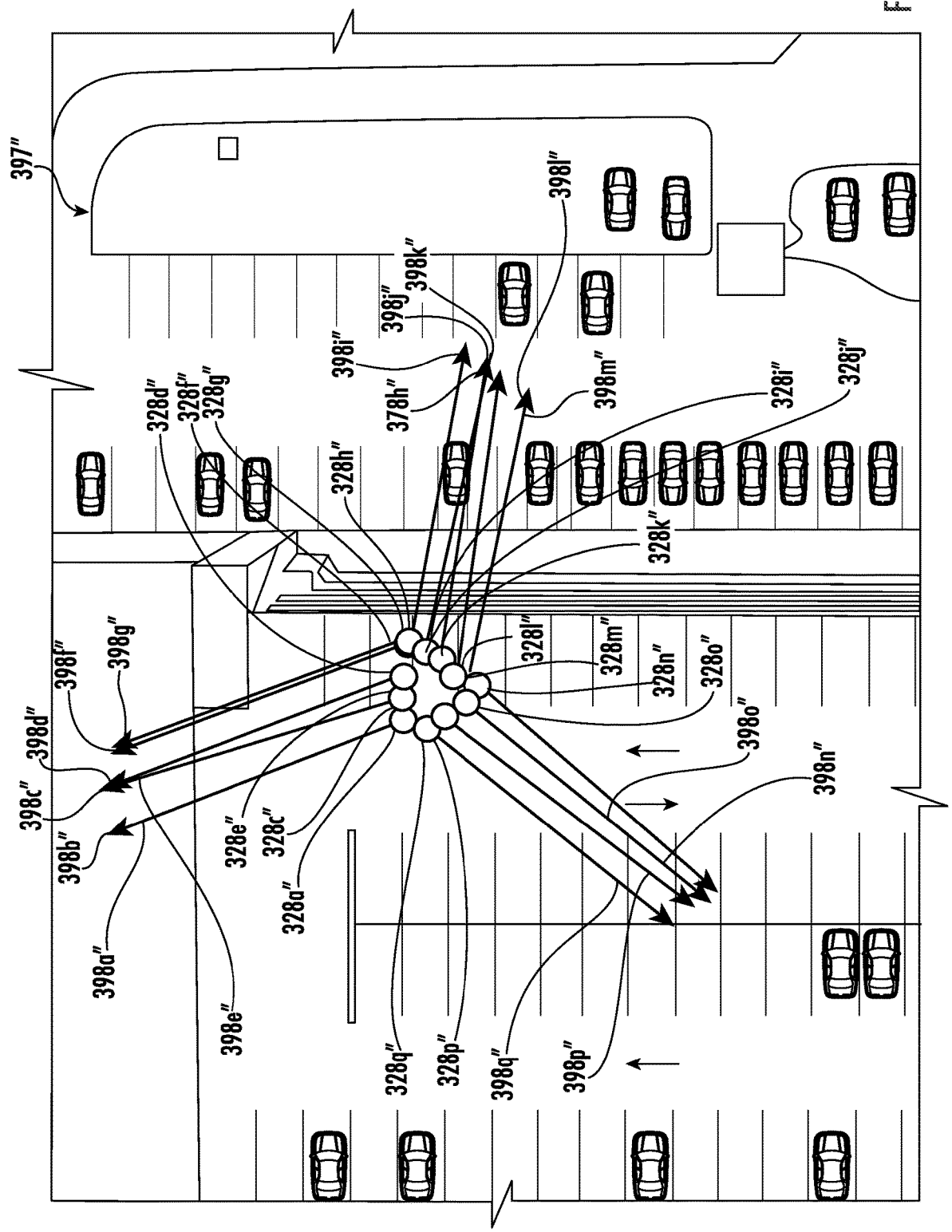
FIG. 20 is an earth browser displaying representative antenna pointing directional indicators generated by the antenna alignment tool of FIG. 19.
Figure 21:
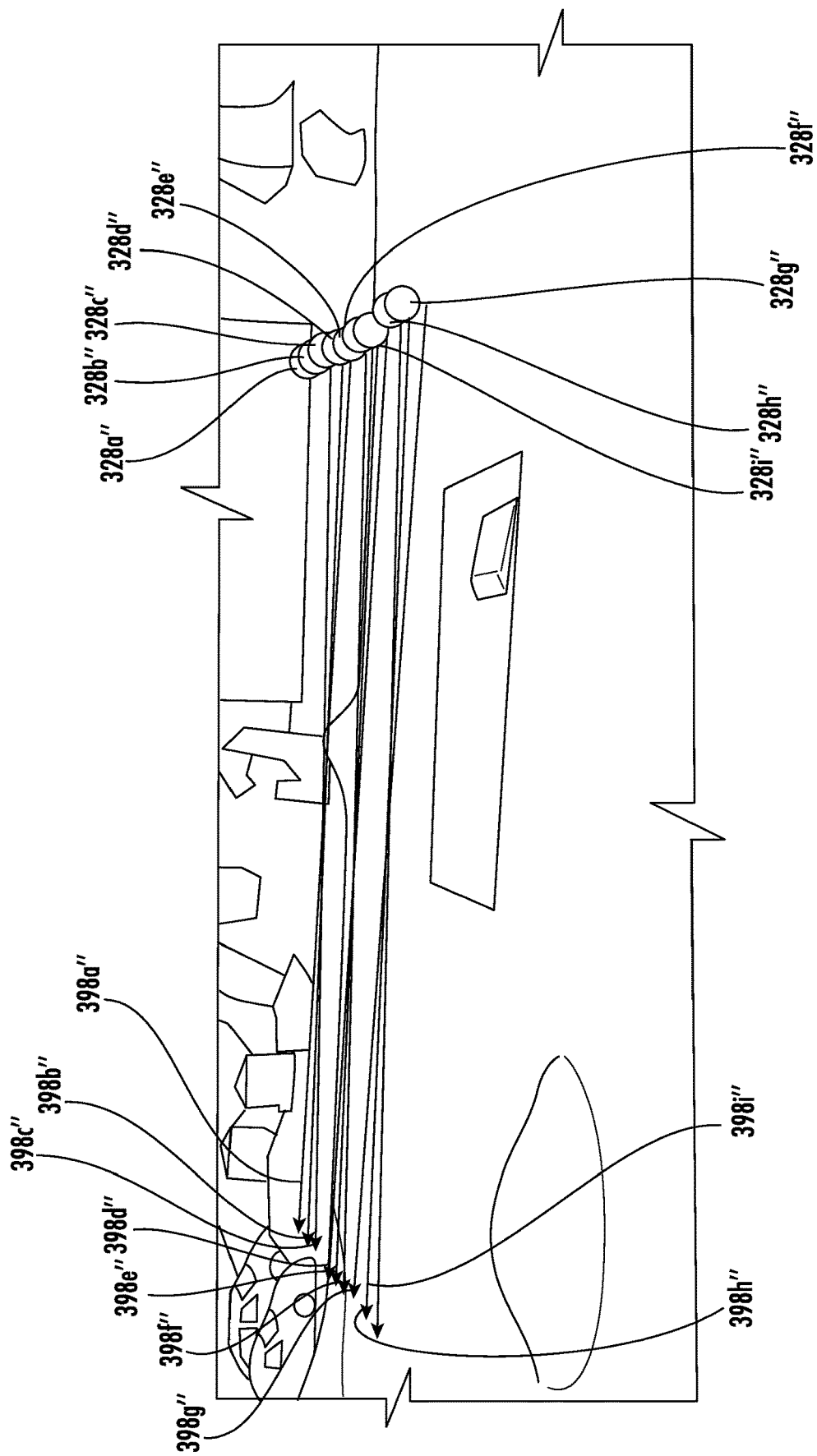
FIG. 21 is an earth browser displaying another view of a portion of the representative antenna pointing directional indicators generated by the antenna alignment tool of FIG. 19.

Referring now to FIGS. 19-21, in another embodiment, there may be multiple antennas 328a"-328q". In addition to determining the actual position data, actual azimuth data, and actual tilt data for the antenna 328a", the processor 352" may obtain respective actual position data, actual azimuth data, and actual tilt data for each of the additional antennas 328b"-328q". Accordingly, in addition to generating an earth browser file 395" for the antenna 328a", the processor 352" may generate the earth browser file 395" for displaying on the earth browser 397" respective representative antenna pointing directional indicators 398b"-398q" (i.e., arrows corresponding to each antenna boresight) based upon the actual position data, actual azimuth data, and the actual tilt data for each of the additional antennas 328b"-328q". Moreover, based upon the earth browser file 395", when viewing in an earth browser 397", selected ones of the representative antenna pointing directional indicators 398a"-398i" may be viewed from multiple viewing angles and locations (FIG. 21), for example, as selected by a user. Advantageously, changes in elevation, for example, may be illustrated the representative antenna pointing directional indicators 398a"-398i". Selection, for example, via input within the earth browser 397", of a given antenna pointing directional indicator 398a"-398q" may display details of the given antenna 328a"-328q", for example, azimuth, AGL, geographic coordinates, etc.

Figure 22:
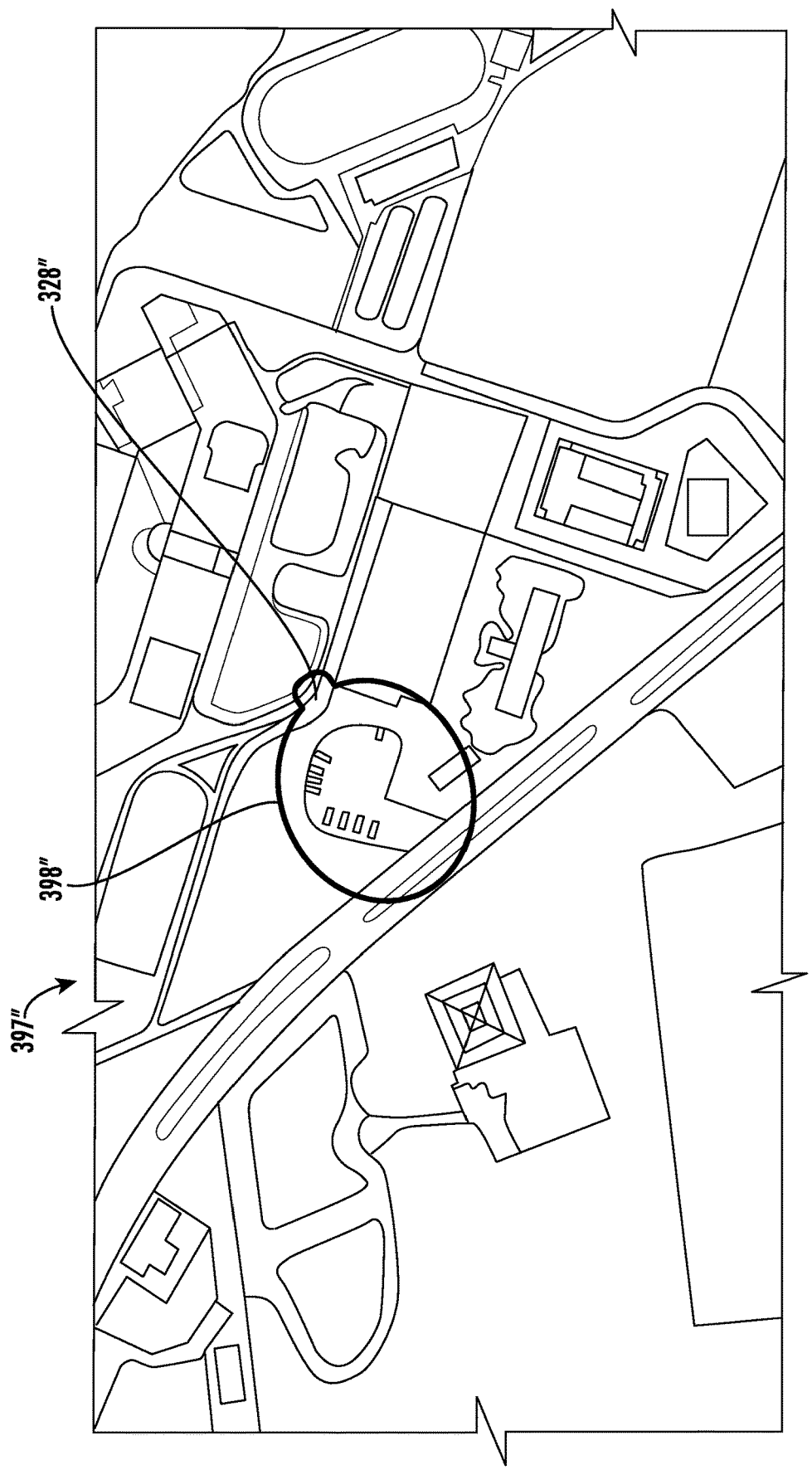
FIG. 22 is an earth browser displaying a representative antenna pointing directional indicator generated by an antenna alignment tool in accordance with another embodiment.

Referring now to FIG. 22, in another embodiment, the antenna 328'" has an antenna gain pattern. The representative antenna pointing directional indicator 398'" is representative of the antenna gain pattern.

Figure 23:
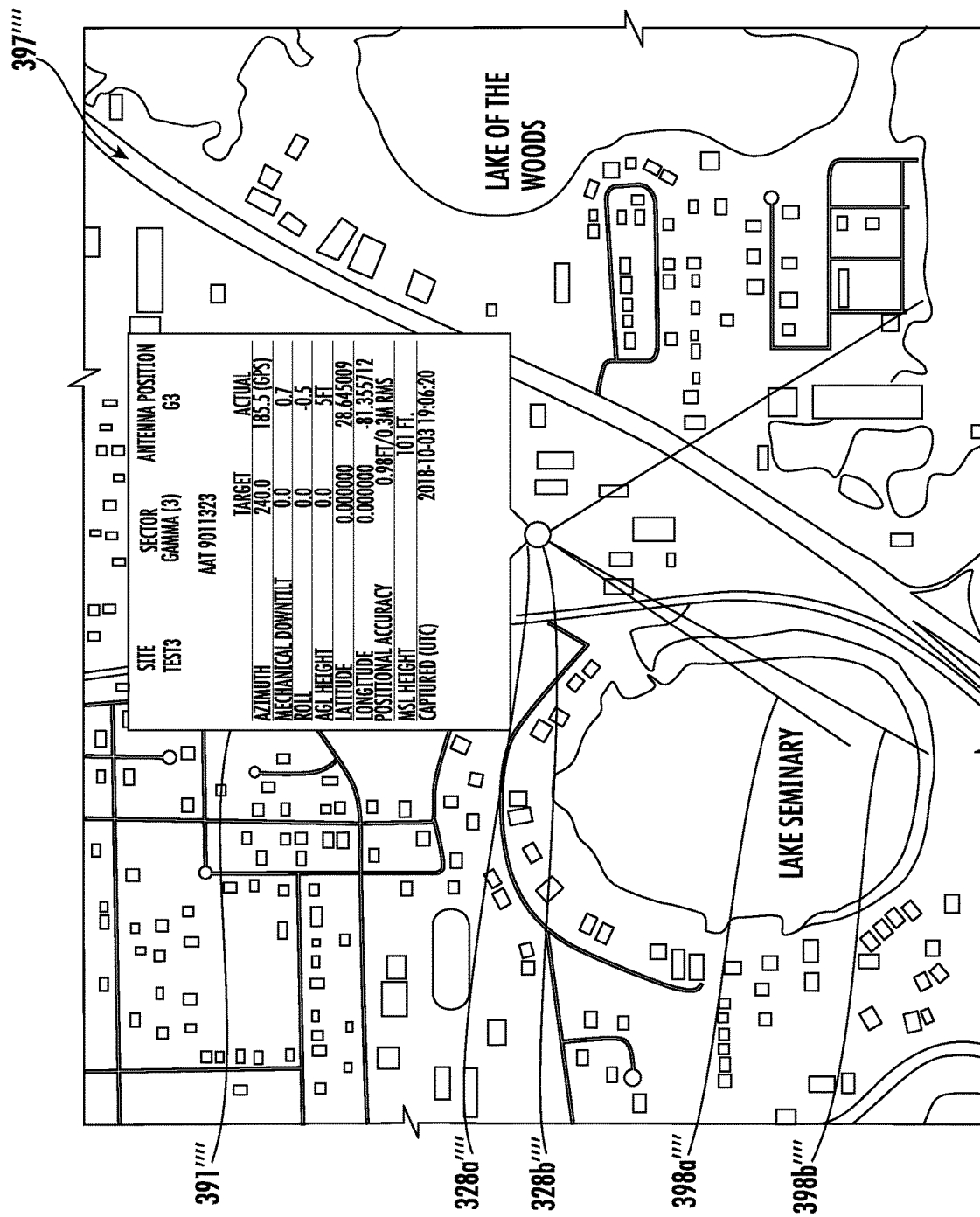
FIG. 23 is an earth browser displaying representative antenna pointing directional indicators generated by an antenna alignment tool in accordance with another embodiment.

Referring now to FIG. 23, in another embodiment, the antennas 328a"", 328b"" each has an antenna sector direction. The respective representative antenna pointing directional indicators 398a"", 398b"" are representative of the antenna sector direction. Moreover, the determined or obtained antenna parameters, for example, the actual position data, the actual azimuth data, and the actual tilt data, may be displayed in a dialog box 391"" on the display of the earth browser 397"". In some embodiments, a dialog box 391"" may not be displayed.

A method aspect is directed to a method of aligning an antenna 328 using an antenna alignment tool 350 to be temporarily mounted to an antenna during alignment. The method may include using the antenna alignment tool 350 to determine actual position data, actual azimuth data, and actual tilt data for the antenna. The antenna alignment tool 350 may also be used to generate an earth browser file 395 for displaying on an earth browser 397 a representative antenna pointing directional indicator 398 based upon the actual position data, actual azimuth data, and actual tilt data for the antenna 328.

As will be appreciated by those skilled in the art, the antenna alignment tool 350 may be particularly advantageous for aligning an antenna. The antenna alignment tool 350 may permit visualization of the antenna parameters, for example, as they relate to other antennas. For example, the antenna alignment tool 350 may be particularly advantageous for alignment of cellular antennas within a sector so that they are parallel. Additionally, the antenna alignment tool 350 may be particularly advantageous for determining, visually, whether any structures have been erected, for example, since an initial study was performed with respect to an antenna.

While several embodiments have been described herein, it should be appreciated that any element from any embodiments may be used with any one or more elements from another embodiment. For example, as described above, the representative antenna pointing directional indicator 398 may be representative of an antenna boresight, an antenna gain, or an antenna sector direction, and any representation of the representative antenna pointing directional indicator 398 may be applied to one or more antennas. Moreover, different representations of the representative antenna pointing directional indicator 398 may be displayed for a single antenna 328 or for multiple antennas, and each representation may be different among antennas.

Figure 24B:
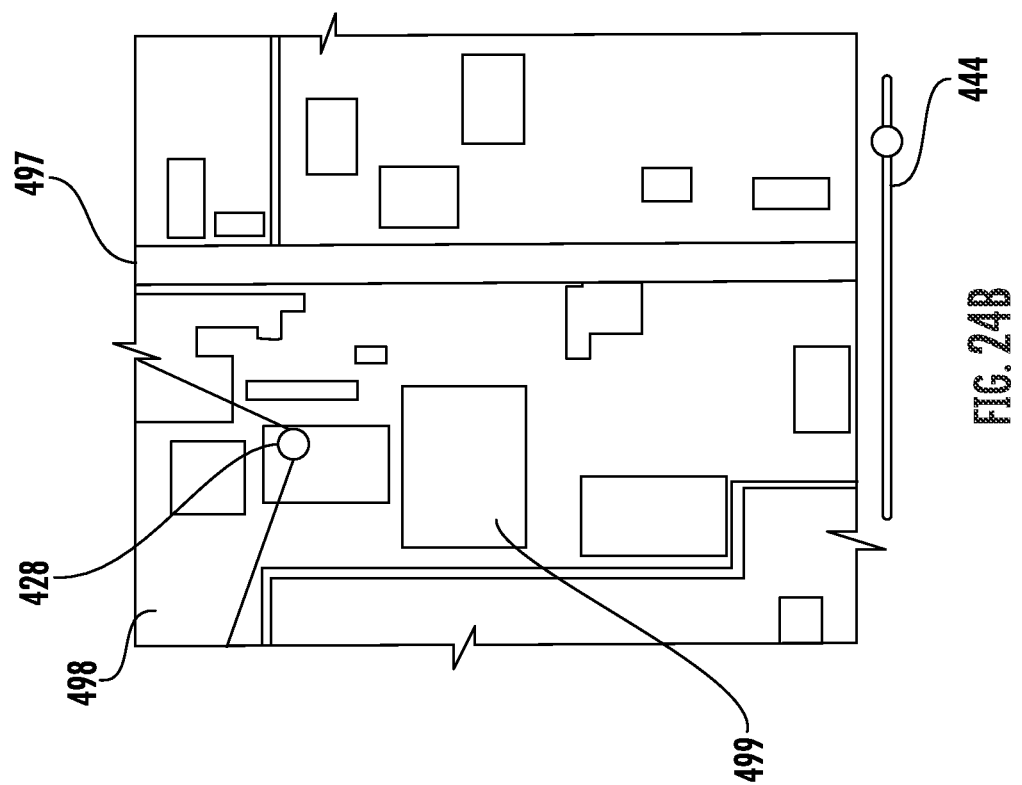
FIGS. 24a and 24b are earth browsers displaying representative antenna pointing directional indicators with varying geographical scenery over time in accordance with another embodiment.
Figure 24A:
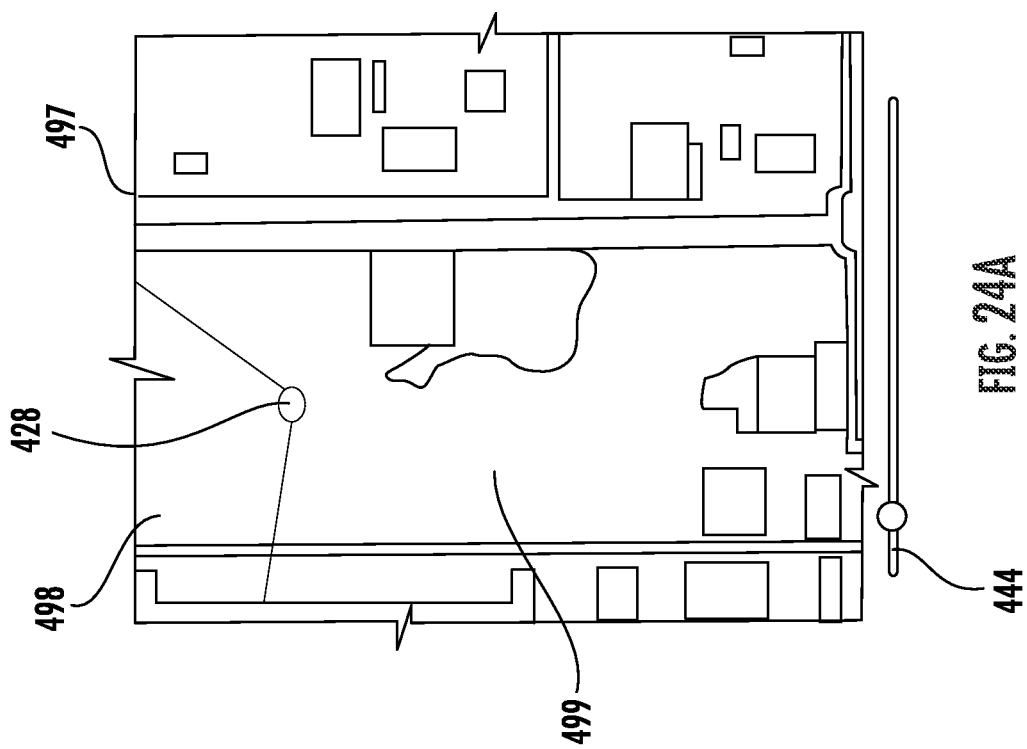

Referring now to FIGS. 24a and 24b, in another embodiment, a history of geographical scenery 499 at a geographic location of an antenna 428 may be displayed along with the corresponding representative antenna pointing directional indicator 498. More particularly, an input 444, for example, in the form of a slider or slide input, may be displayed on the earth browser 497. Movement of the input or slider, for example, from left to right, may correspond to a change in the geographical scenery 499 from an earlier time (FIG. 24a) to a later time (FIG. 24b). In other words, by sliding the slider from left to right, changes in geographical scenery over time (e.g., new buildings, changed roads, buildings, etc.) would be displayed on the earth browser 497. Those skilled in the art may appreciate that the historical geographical scenery 499 or changes in the building data may be stored in the earth browser file. The history of geographical scenery 499 may be particularly advantageous for identifying new buildings or other potential obstructions, and/or identifying new geographic locations for a new antenna.

Figure 25:
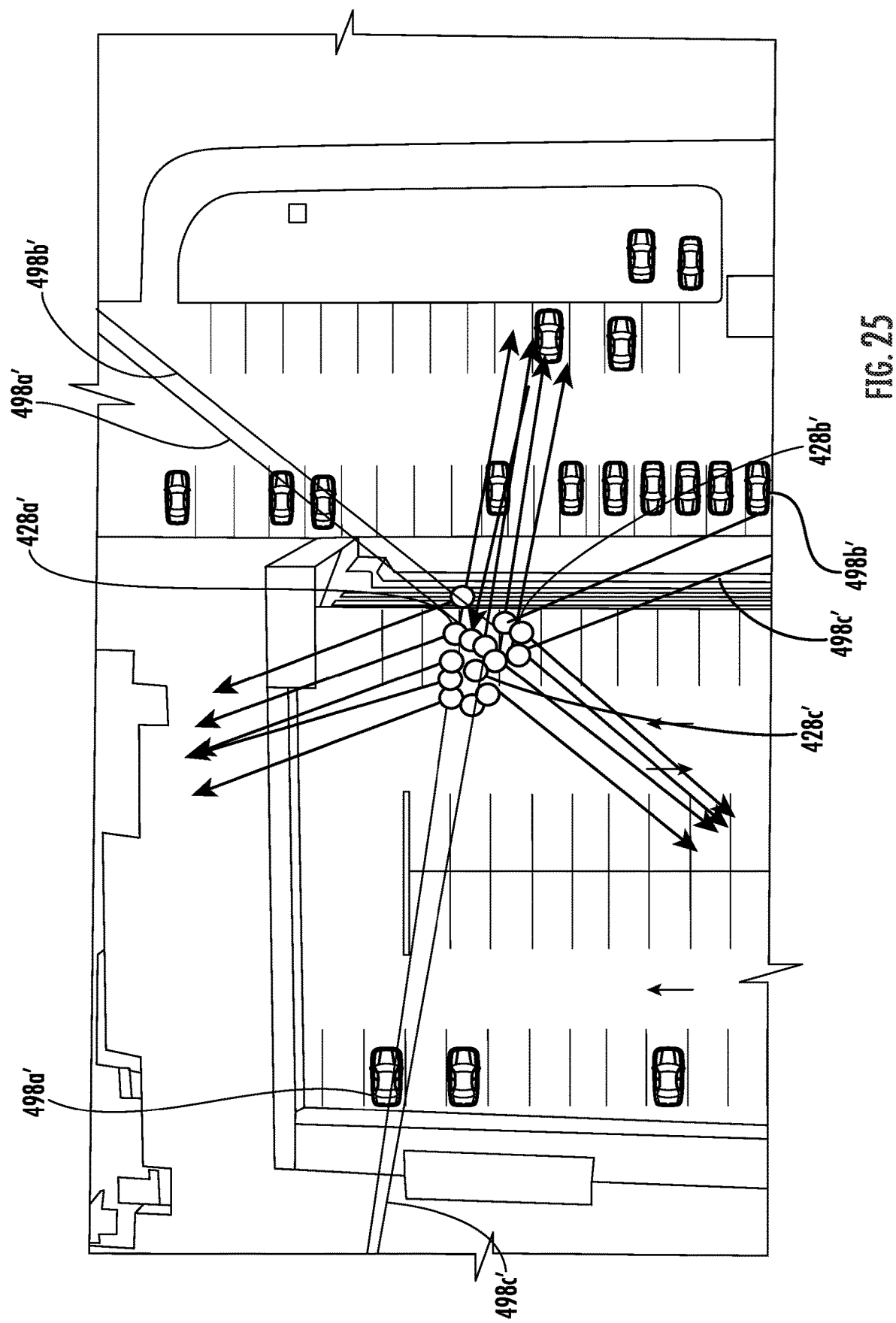
FIG. 25 is an earth browser displaying representative antenna pointing directional indicators of adjacent antennas relative to a given antenna in accordance with an embodiment.
Figure 26:
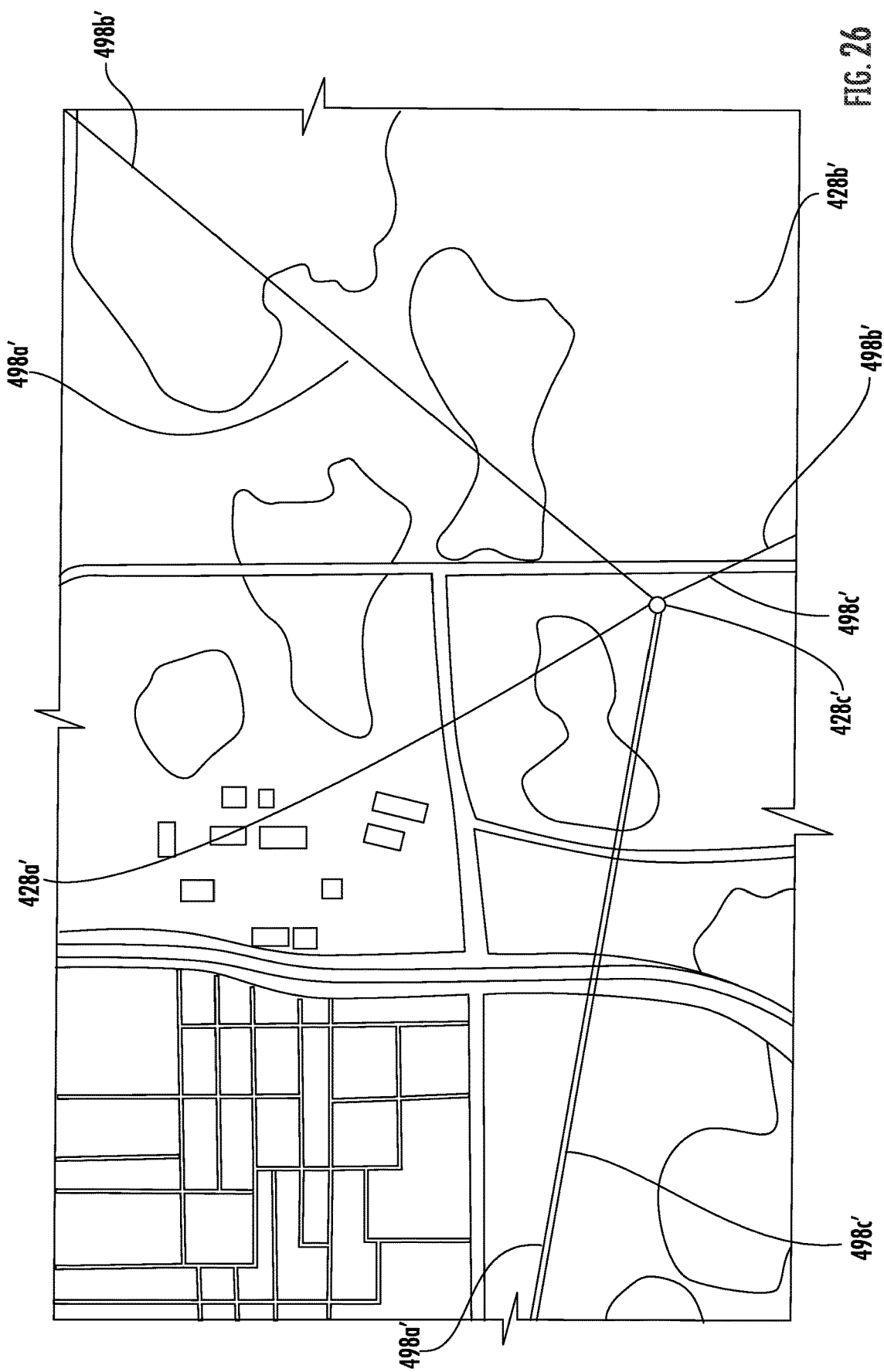
FIG. 26 is another earth browser displaying representative antenna pointing directional indicators of adjacent antennas relative to a given antenna in accordance with the embodiment of FIG. 25.

Referring now to FIGS. 25 and 26, in another embodiment, alignment data or records from adjacent sites or antennas 428b', 428c' (e.g., based upon their respective alignment data) can be displayed at the same time as the alignment data for a given antenna 428a'. More particularly, the corresponding representative antenna pointing directional indicator 498a' for a given antenna 428a' may be displayed along with the corresponding representative antenna pointing directional indicators 498b', 498c' for adjacent antennas 428b', 428c'. Accordingly, potential interference from the adjacent antennas 428b', 428c' may be easily and visually identified. Alternatively or additionally, gaps in coverage may also be identified.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An antenna alignment tool comprising:
a housing to be temporarily mounted to an antenna during alignment; and
a processor carried by said housing and configured to
determine actual position data, actual azimuth data, and actual tilt data for the antenna,
generate an earth browser file for displaying on an earth browser a representative antenna pointing directional indicator based upon the actual position data, actual azimuth data, and actual tilt data for the antenna, and
change a visual characteristic of the representative antenna pointing directional indicator at earth browser obstructions.

2. The antenna alignment tool of claim 1 wherein the antenna has an antenna boresight; and wherein the representative antenna pointing directional indicator is representative of a pointing direction of the antenna boresight.

3. The antenna alignment tool of claim 2 wherein the representative antenna pointing directional indicator comprises an arrow.

4. The antenna alignment tool of claim 1 wherein the antenna has an antenna gain pattern; and wherein the representative antenna pointing directional indicator is representative of the antenna gain pattern.

5. The antenna alignment tool of claim 1 wherein the antenna has an antenna sector direction; and wherein the representative antenna pointing directional indicator is representative of the antenna sector direction.

6. The antenna alignment tool of claim 1 wherein the representative antenna pointing directional indicator stops at the earth browser obstructions.

7. The antenna alignment tool of claim 1 further comprising wireless communications circuitry carried by said housing and cooperating with the processor to wirelessly communicate the earth browser file to a remote device.

8. The antenna alignment tool of claim 1 wherein the processor is configured to obtain actual position data, actual azimuth data, and actual tilt data for at least one additional antenna, and generate the earth browser file for displaying on the earth browser a further representative antenna pointing directional indicator based upon the actual position data, actual azimuth data, and actual tilt data for the at least one additional antenna.

9. The antenna alignment tool of claim 8 wherein the representative and further representative antenna pointing directional indicators each has a different associated visual characteristic.

10. The antenna alignment tool of claim 1 wherein the earth browser comprises Google Earth; and wherein the earth browser file comprises a keyhole markup language (KML) file.

11. The antenna alignment tool of claim 1 wherein the earth browser comprises an input for displaying geographical scenery at a corresponding geographic location of the antenna at a selected historical time period.

12. An antenna alignment tool comprising:
a housing to be temporarily mounted to an antenna during alignment; and
a processor carried by said housing and configured to
determine actual position data, actual azimuth data, and actual tilt data for the antenna,
obtain actual position data, actual azimuth data, and actual tilt data for at least one additional antenna,
generate a keyhole markup language (KML) file for displaying on a Google Earth browser respective representative antenna pointing directional indicators based upon the actual position data, actual azimuth data, and actual tilt data for the antenna and the at least one additional antenna, and
change a visual characteristic of the respective representative antenna pointing directional indicators at earth browser obstructions.

13. The antenna alignment tool of claim 12 wherein the antenna and the at least one additional antenna each has an antenna boresight; and wherein the representative antenna pointing directional indicators are each representative of a pointing direction of the respective antenna boresight.

14. The antenna alignment tool of claim 13 wherein the representative antenna pointing directional indicators each comprises an arrow.

15. The antenna alignment tool of claim 12 wherein the antenna and the at least one additional antenna each has an antenna gain pattern; and wherein the representative antenna pointing directional indicators are each representative of the antenna gain pattern.

16. The antenna alignment tool of claim 12 wherein the antenna and the at least one additional antenna each has an antenna sector direction; and wherein the representative antenna pointing directional indicators are each representative of the antenna sector direction.

17. The antenna alignment tool of claim 12 wherein the representative antenna pointing directional indicators each has a different associated visual characteristic.

18. The antenna alignment tool of claim 12 wherein the Google Earth browser comprises an input for displaying geographical scenery at a corresponding geographic location of the antenna and the at least one additional antenna at a selected historical time period.

19. A method of aligning an antenna using an antenna alignment tool to be temporarily mounted to an antenna during alignment, the method comprising:
using the antenna alignment tool to
determine actual position data, actual azimuth data, and actual tilt data for the antenna,
generate an earth browser file for displaying on an earth browser a representative antenna pointing directional indicator based upon the actual position data, actual azimuth data, and actual tilt data for the antenna, and
change a visual characteristic of the representative antenna pointing directional indicator at earth browser obstructions.

20. The method of claim 19 wherein the antenna has an antenna boresight; and wherein the representative antenna pointing directional indicator is representative of a pointing direction of the antenna boresight.

21. The method of claim 20 wherein the representative antenna pointing directional indicator comprises an arrow.

22. The method of claim 19 wherein the antenna has an antenna gain pattern; and wherein the representative antenna pointing directional indicator is representative of the antenna gain pattern.

23. The method of claim 19 wherein the antenna has an antenna sector direction; and wherein the representative antenna pointing directional indicator is representative of the antenna sector direction.

24. The method of claim 19 wherein the representative antenna pointing directional indicator stops at the earth browser obstructions.

25. The method of claim 19 wherein using the antenna alignment tool comprises using the antenna alignment tool to wirelessly communicate the earth browser file to a remote device.

26. The method of claim 19 wherein using the alignment tool comprises using the alignment tool to obtain actual position data, actual azimuth data, and actual tilt data for at least one additional antenna, and generate the earth browser file for displaying on the earth browser a further representative antenna pointing directional indicator based upon the actual position data, actual azimuth data, and actual tilt data for the at least one antenna.

27. The method of claim 19 wherein the earth browser comprises an input for displaying geographical scenery at a corresponding geographic location of the antenna at a selected historical time period.

\* \* \* \* \*